United States Patent
Raja Jayaraman et al.

(10) Patent No.: US 11,055,079 B2
(45) Date of Patent: Jul. 6, 2021

(54) SYSTEMS AND METHODS FOR JUST-IN-TIME APPLICATION IMPLEMENTATION

(71) Applicant: VMWARE, INC., Palo Alto, CA (US)

(72) Inventors: Vignesh Raja Jayaraman, Palo Alto, CA (US); Jairam Choudhary, Palo Alto, CA (US); Charansing Deore, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/264,353

(22) Filed: Jan. 31, 2019

(65) Prior Publication Data

US 2020/0249926 A1    Aug. 6, 2020

(51) Int. Cl.
G06F 9/44 (2018.01)
G06F 9/445 (2018.01)
G06F 8/61 (2018.01)

(52) U.S. Cl.
CPC ............... *G06F 8/63* (2013.01); *G06F 9/445* (2013.01)

(58) Field of Classification Search
CPC .................................. G06F 8/63; G06F 9/445
See application file for complete search history.

(56) References Cited

U.S. PATENT DOCUMENTS

| 7,577,722 | B1 | 8/2009 | Khandekar | |
| 8,438,654 | B1 | 5/2013 | Von Eicken | |
| 8,793,684 | B2 | 7/2014 | Breitgand | |
| 9,323,778 | B2 | 4/2016 | Kacin | |
| 9,602,950 | B1 | 3/2017 | Gonzalez | |
| 9,614,873 | B1 * | 4/2017 | Theimer | H04L 63/0272 |
| 10,198,163 | B2 * | 2/2019 | Yabuki | G06F 3/04886 |
| 10,318,251 | B1 * | 6/2019 | Darnell | G06F 30/00 |
| 2011/0004647 | A1 * | 1/2011 | Parida | H03H 17/0282 708/313 |
| 2011/0276961 | A1 | 11/2011 | Johansson | |

(Continued)

OTHER PUBLICATIONS

Dishan M. Francis, Step-by-Step Guide to setup Just-int-time VM Access in Azure, 2018. http://www.rebeladmin.com/2018/02/step-step-guide-just-time-vm-access-azure/ (Year: 2018).*

(Continued)

*Primary Examiner* — Mongbao Nguyen
(74) *Attorney, Agent, or Firm* — Clayton, McKay & Bailey, PC

(57) ABSTRACT

Systems and methods for implementing an application on a just-in-time basis can include selection of one of an application and a bundle of applications ("selected application") by a user on a user interface of a portal application. An agent on the user device can obtain a use-policy for accessing a virtual disk corresponding to the selected application and launch the selected application. The virtual disk can be accessed with the agent according to the use-policy. The portal application can send a resource request to the agent for an update on a status of at least one of a virtual disk download and an application launch. The resource request can be one of a script request and an image request, and can be generated by the portal application based on an information package that incorporates the use-policy and is associated with an option selected through the PUI for the selected application.

18 Claims, 11 Drawing Sheets

(56) References Cited

U.S. PATENT DOCUMENTS

| | | | | |
|---|---|---|---|---|
| 2012/0030646 | A1* | 2/2012 | Ravindran | G06F 9/4494 |
| | | | | 717/105 |
| 2012/0096365 | A1* | 4/2012 | Wilkinson | G06F 9/468 |
| | | | | 715/740 |
| 2012/0311257 | A1 | 12/2012 | Berman | |
| 2013/0014107 | A1* | 1/2013 | Kirchhofer | G06F 9/5083 |
| | | | | 718/1 |
| 2013/0047149 | A1* | 2/2013 | Xu | G06F 21/53 |
| | | | | 717/175 |
| 2014/0026231 | A1 | 1/2014 | Barak | |
| 2014/0032759 | A1* | 1/2014 | Barton | H04L 67/10 |
| | | | | 709/225 |
| 2014/0344061 | A1* | 11/2014 | Choi | G06Q 30/0267 |
| | | | | 705/14.64 |
| 2015/0358357 | A1 | 1/2015 | Diaz-Tellez | |
| 2016/0132214 | A1* | 5/2016 | Koushik | H04L 63/10 |
| | | | | 715/741 |
| 2016/0378451 | A1* | 12/2016 | Walker | G06F 8/52 |
| | | | | 717/111 |
| 2017/0032378 | A1* | 2/2017 | Ciszewski | G06Q 30/018 |
| 2017/0034023 | A1* | 2/2017 | Nickolov | H04L 43/0817 |
| 2017/0052764 | A1* | 2/2017 | Laskey | G06F 8/31 |
| 2017/0102989 | A1* | 4/2017 | Kotikalapudi | G06F 11/076 |
| 2017/0180346 | A1* | 6/2017 | Suarez | G06F 9/45558 |
| 2017/0322787 | A1* | 11/2017 | Patidar | G06F 8/61 |
| 2018/0205736 | A1* | 7/2018 | Elyashar | H04L 63/108 |
| 2018/0260537 | A1* | 9/2018 | Malik | G06F 21/105 |
| 2018/0316550 | A1* | 11/2018 | Patel | H04L 41/0893 |
| 2018/0365051 | A1* | 12/2018 | Radhakrishnan | G06F 9/45558 |
| 2019/0075130 | A1* | 3/2019 | Petry | H04L 67/2814 |
| 2019/0163912 | A1* | 5/2019 | Kumar | G06F 8/65 |
| 2019/0205408 | A1* | 7/2019 | Chen | G06F 11/0709 |
| 2019/0268306 | A1 | 8/2019 | Naik | |
| 2020/0004566 | A1* | 1/2020 | Maxilom | G06F 9/4555 |

OTHER PUBLICATIONS

Vmware, VMware Identity Manager Administration, 2018, pp. 1-140. https://docs.vmware.com/en/VMware-Workspace-ONE-Access/3.3/idm-administrator.pdf (Year: 2018).*

Dishan M. Francis, Step-by-Step Guide to setup Just-in-time VM access in Azure, 2018, pp. 1-11. https://www.rebeladmin.com/2018/02/step-step-guide-just-time-vm-access-azure/ (Year: 2018).*

* cited by examiner

SYSTEMS AND METHODS FOR JUST-IN-TIME APPLICATION IMPLEMENTATION

BACKGROUND

Enterprises use virtual computing infrastructures to provide employees with nimble computing solutions that can be used and accessed on multiple devices in different locations. This allows members of the enterprise to access and use communication, productivity, and file access and management applications that an enterprise can maintain, manage, keep secure, and selectively deliver to enterprise-owned or managed devices used by enterprise employees. A further aspect of virtual computing infrastructures is that within a delivered application, an enterprise can implement usage, access, and utilization policies with respect to individual or designated groups of employees. Maintenance, management, security monitoring, delivery, and policy development can be accomplished by administrators of enterprise management systems, for example, Mobile Device Management ("MDM") or Enterprise Mobility Management ("EMM") systems.

An enterprise's overall computing and communications infrastructure that incorporates virtual components may utilize a combination of on-premises physical, cloud, or Virtual Desktop Infrastructure ("VDI") environments. With respect to enterprise applications, the heterogeneity of environments can result in disparate packaging, cataloging, entitlement, modes of delivery, registration, client-side agent services, and server-side management services. It follows that implementations for delivering or virtualizing and delivering, an application or package of applications, and ultimately executing any one application may differ according to environment. In some implementations, an application may be run locally on a physical end point, in others an application may be run remotely, and still others may be specifically tailored for VDI environments. Each of these implementations may require custom-built client and server execution schemes and components.

With a local implementation, for example, an application package may be provided that runs locally and contains a runtime environment. This can require registration with an operating system ("OS") and does not have delivery methods built-in. Further, additional client-side user space and kernel space components may be required. In the case of remote implementations, an application may run on a remote terminal server and a respective top-level window may display locally on an end-point. Although web-applications may be used within this implementation to provide application functionality on-demand, prior registration with an OS, a client-side runtime, and server-side logic may all be required. In other implementations that may be employed for VDI environments, packages of applications can be provided as disk-images or archive files. The packages may be attached to a virtual machine on logon, which includes a registration process, and a client must work with a server at a back-end to run an application.

All these implementations require at a minimum, prior registration with an operating system of a physical end-point when a user-logon occurs. But as mentioned above, the registration process may not be standardized across all environments. In any event, registration processes may delay successful logons, and be tied to time and resource consuming on-logon policy downloading and application installation. The user cannot use the application until this time-consuming installation process is complete.

In some of the implementations mentioned, an endpoint physical device is caused to process and execute a substantial amount of operations at logon. Packages of applications or other types of executables of significant size may have to be downloaded and installed, or uninstalled at logon. In other situations, this may occur at a time when a user attempts to access an application. Either process can reduce employee efficiency by consuming time, as well as appreciably tax an end-point device and an enterprise network by tying up computing resources and bandwidth, respectively. What is more, in a majority of implementations, bundles of applications, rather than a specific one or two needed by a user at a specific time of execution, may be downloaded and installed on a device. Accordingly, a large amount of unrecoverable resources may be expended to deliver applications that are never used.

Other implementations may require the download of internet plugins on an end-point device to implement an application provided as, for example, a web application. This of course creates a footprint on the end-point device which can limit space and resources for other programs and processes in a similar respect to a package downloaded at logon or another time. However, even though a footprint is associated with this implementation, it is not a footprint that comes with a benefit of a user being able to use an application on a device that is not connected at a minimum to a network such as the internet, let alone one that is not connected to an enterprise network. Regardless of whether an enterprise desires that a particular employee be able to launch and run an application when the employee's device is offline, an enterprise cannot enable this capability with an enterprise managed application implemented as a web application.

As a result, a need exists for systems and methods for universal on-demand application delivery and implementation across all environments (physical, cloud, and VDI), which may be limited to only those applications to-be utilized. More specifically, a need exists for systems and methods that, at least when an end-point device is connected to a network, provide users with an ability to launch and run applications on demand without requiring prior installation, an operating-system registration, or the provision of server-side management services. A further need exists for systems and methods that provide enterprise prescribed user-specific local implementation of applications that have been delivered without prior installation, operating-system registration, or execution of server management services.

SUMMARY

Examples described herein include systems and methods for implementing applications on a user device on a just-in-time basis with a virtual disk that is implemented at a time the applications are respectively selected for use. In one example, a user may select an entry point corresponding to an application so the application can be implemented. The entry point can be presented as a selectable option within a catalog displayed on a portal page provided by a portal application on a user device. The portal application can communicate the selection to an agent on the user device through a customized communication protocol. The portal application can pass information to the agent that is necessary for the agent to locate and attach locally or across a network, only that virtual disk which exclusively corresponds to the selected application represented by the clicked-on entry point. Further information passed may enable the agent to implement the corresponding virtual disk and launch the selected application, and cause the portal application to have a main window of the selected application open (user interface delivery) right away for a full implementation of the selected application. Thus, a user can start using a selected application immediately according to the present disclosure.

More specifically, in one example, a portal application on the user device can implement a user interface ("portal app. UI" or "PUI") configured to display a catalog of selectable applications. A selection of one application or specific application bundle ("selected application") can be received via the PUI, and an agent on the user device can access a virtual disk corresponding to the selected application according to a use-policy maintained by a portal. The agent can generate launch instructions for launching the selected application on the user device according to a type of virtual disk access, and the virtual disk can be implemented on the user device. The selected application can be implemented on the user device according to the application launch instructions. In one example, implementing the selected application can include the agent launching the selected application from the virtual disk, and the portal application facilitating a delivery of a user interface for the selected application ("the application UI" or "AUI").

In another example, an agent can access a virtual disk corresponding to the selected application by attaching the virtual disk to the user device including the agent. The virtual disk can be attached from a source based on a use-policy for the selected application and a connection status between the user device and a portal. In one example, the source can be a local source on the user device, or a network source relative to the user device. In another example, an agent can generate instructions for obtaining a copy of a virtual disk corresponding to a selected application based on the use-policy and the connection status.

In yet another example, communication between a portal application on a user device and a web server of an agent provided on the user device, can enable the portal application to direct the agent to access and implement a virtual disk corresponding to a selected application. The agent can launch the selected application and direct the portal application to facilitate delivery of an AUI of the selected application consistent with application launch instructions that the agent generates based on use-policies provided by a portal or stored by the agent. However, in one example, a native install footprint may not be created on the user device even though selected applications can launch immediately from a local source or across a network. This is because in one example, code that is native to the portal application allows the portal application to request the agent carry out certain instructions, and receive instructions from the agent that the portal application can carry out.

The systems and methods according to the present disclosure can be implemented in any environment (physical, on-premises, VDI, cloud) that may be utilized by in an enterprise computing infrastructure. Further, since a selected application is implemented, alone and only when it is selected, from a virtual disk that is either accessed locally or through a portal that the user device is currently logged on to, there is no downloading that occurs when a user logs on to an operating system of the user device or logs onto to a portal through a portal application. Accordingly, operations of the user device are not slowed at the time of either logon due to resources being allocated to any type of download or install at that time.

In addition, in one example where an admin-configured use-policy specific to the user allows, an agent can download and cache a local copy of a virtual disk corresponding to a selected application as the application is being implemented across a network. In one example, the copy can then be used to implement the application on subsequent system logons with just the system logon, as opposed to an additional portal logon.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for implementing applications on a user device on a just-in-time basis with a virtual disk that is implemented at a time the applications are respectively selected for use. A portal application on the user device can implement a PUI configured to display a catalog of selectable applications. A selection of one application or specific bundle of applications ("selected application") can be received via the PUI, and an agent on the user device can access a virtual disk corresponding to the selected application. The virtual disk can be located at a remote network location and accessed according to a use-policy for the selected application. The use policy can be relative to the user. An agent on the user device can attach the virtual disk over the network and maintain a connection status based on the use-policy.

In one example, the virtual disk can be accessed locally or across a network, depending on the use-policy and whether the virtual disk has already been cached locally. The agent can generate launch instructions for launching the selected application on the user device according to a type of virtual disk access (for example, network versus local). In another example, the agent can generate download instructions for obtaining a copy of a virtual disk corresponding to a selected application based on a use-policy, a connection status, and a type of virtual disk access. Implementing the selected application can include the agent launching the selected application from the virtual disk, and the portal application facilitating delivery of an AUI. The selected application can be implemented on the user device according to the application launch instructions.

Figure 1:
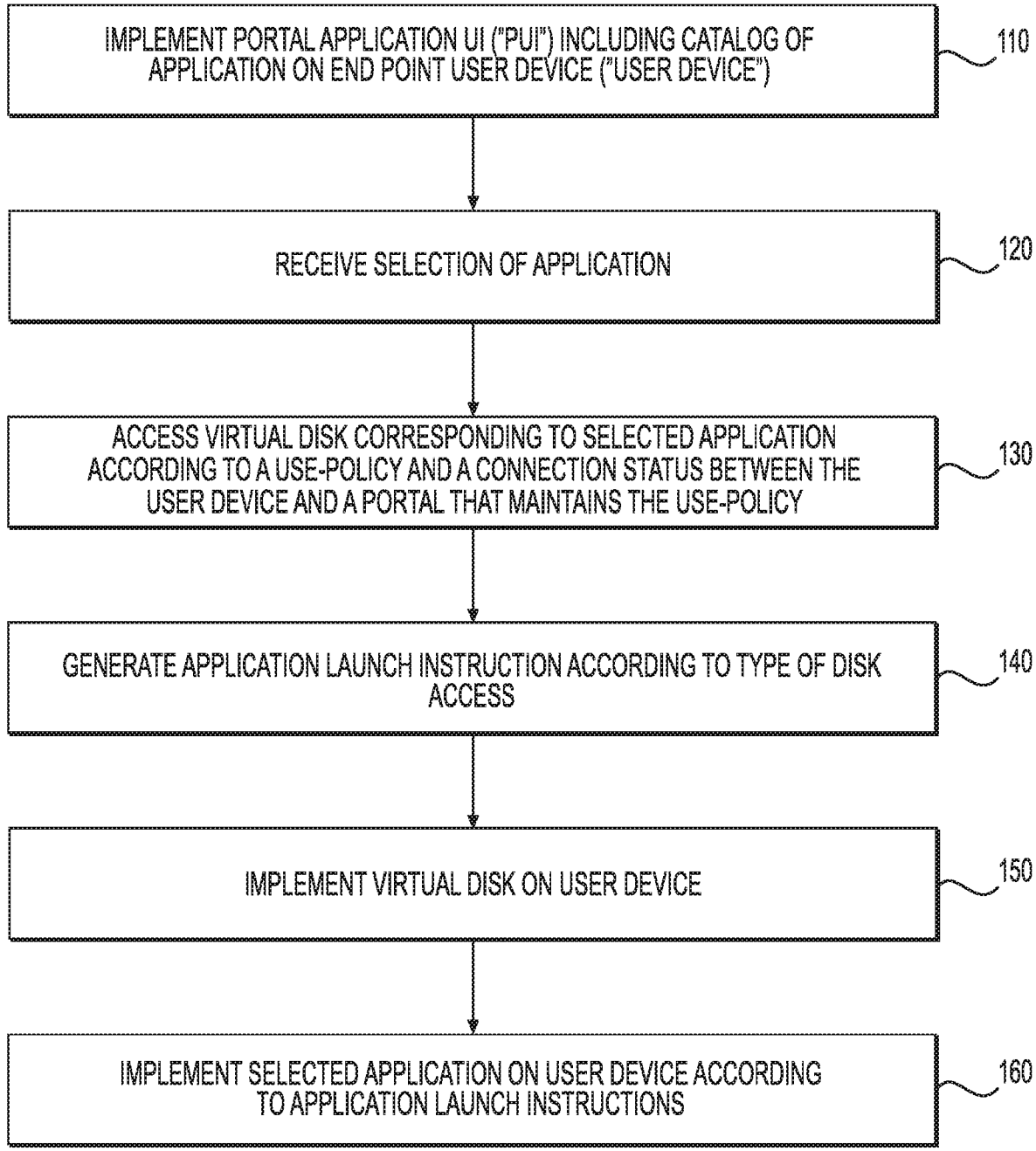
FIG. 1 is a flowchart of an exemplary method for implementing applications on a just-in-time basis.
Figure 2A:
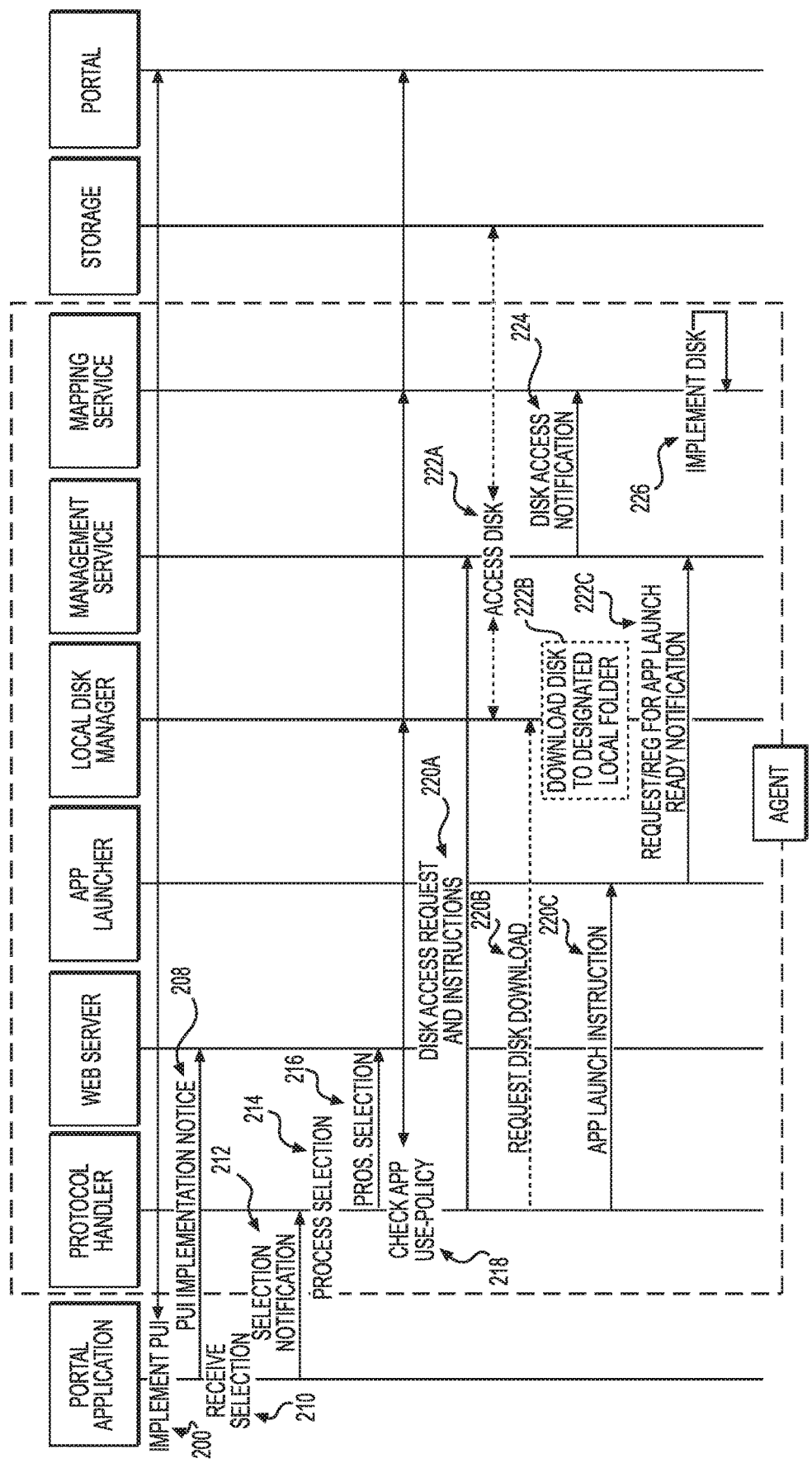
FIGS. 2A and 2B provide a sequence diagram of an exemplary method for implementing an application on a just-in-time basis.
Figure 2B:
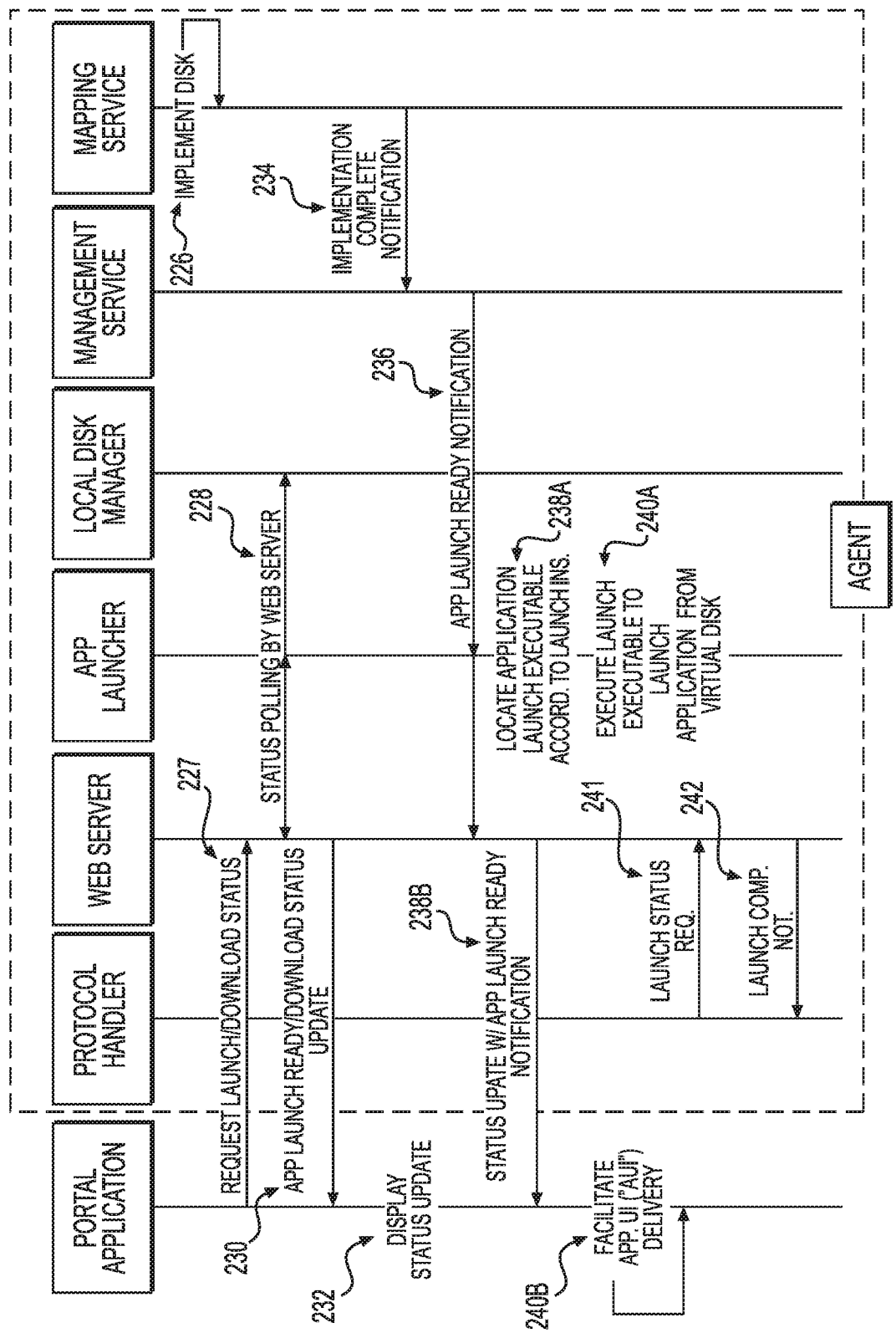
Figure 3:
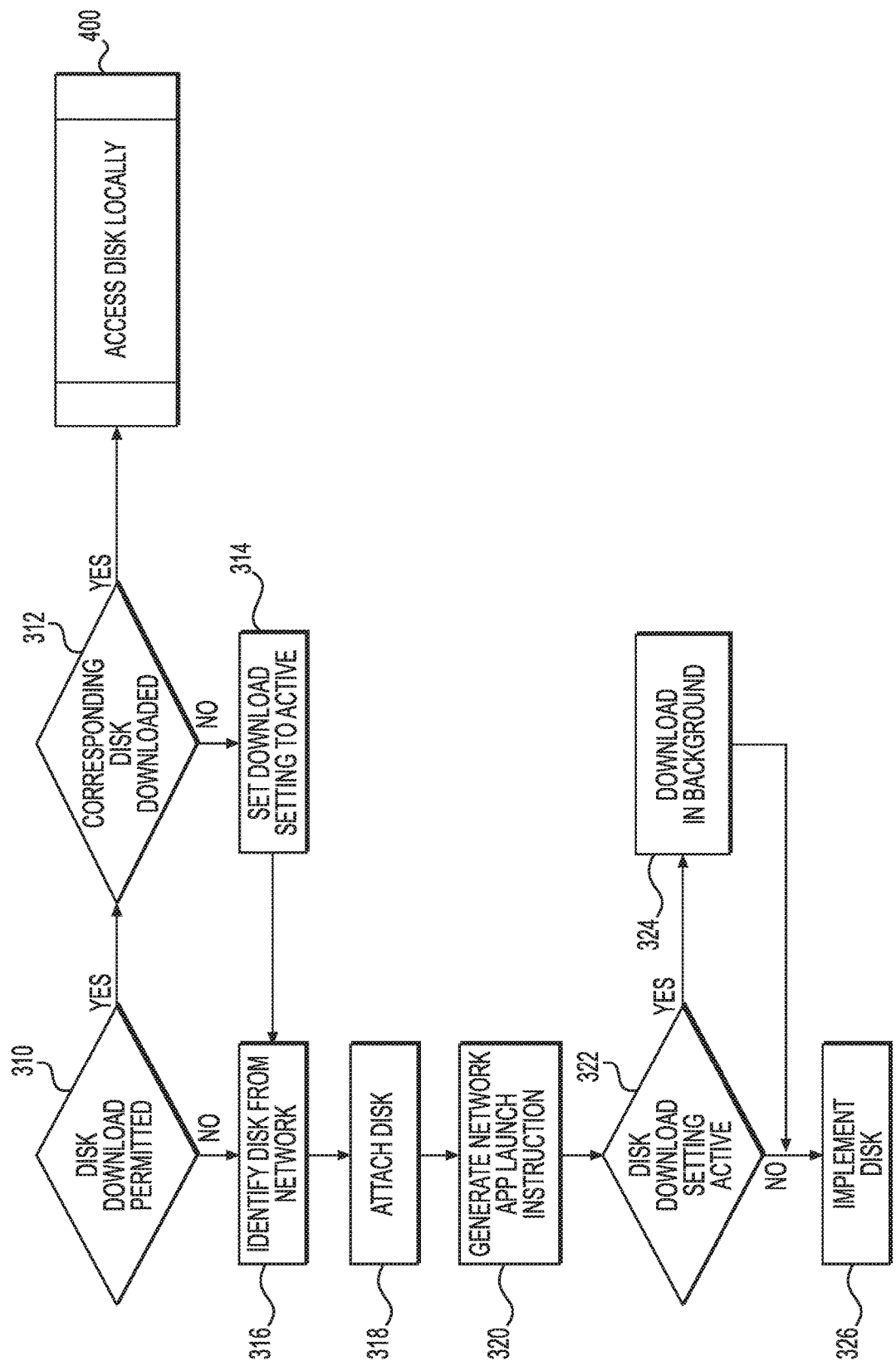
FIG. 3 is a flowchart of an exemplary method for generating an instruction for launching an application according to a network launching protocol.
Figure 4:
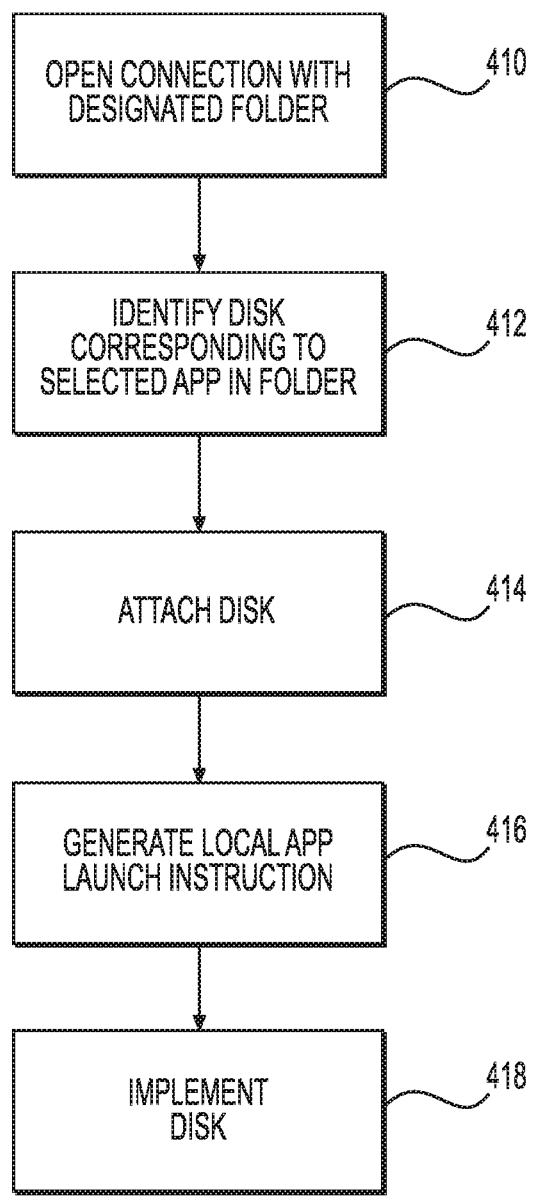
FIG. 4 is a flowchart of an exemplary method for generating an instruction for launching an application according to a local launching protocol.
Figure 5A:
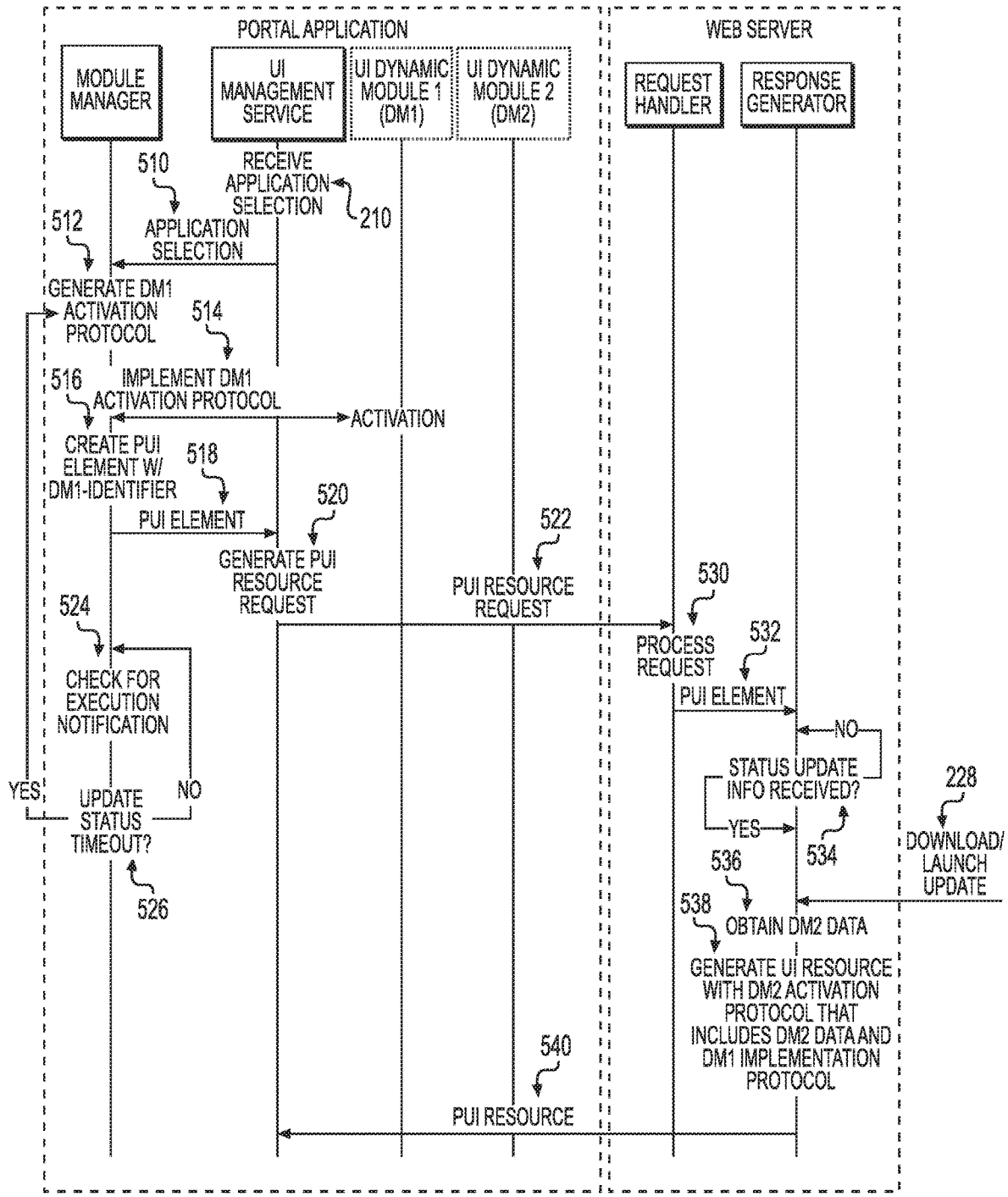
FIGS. 5A and 5B provide a sequence diagram of an exemplary method of updating a launch and download status for a selected application in a portal application.
Figure 5B:
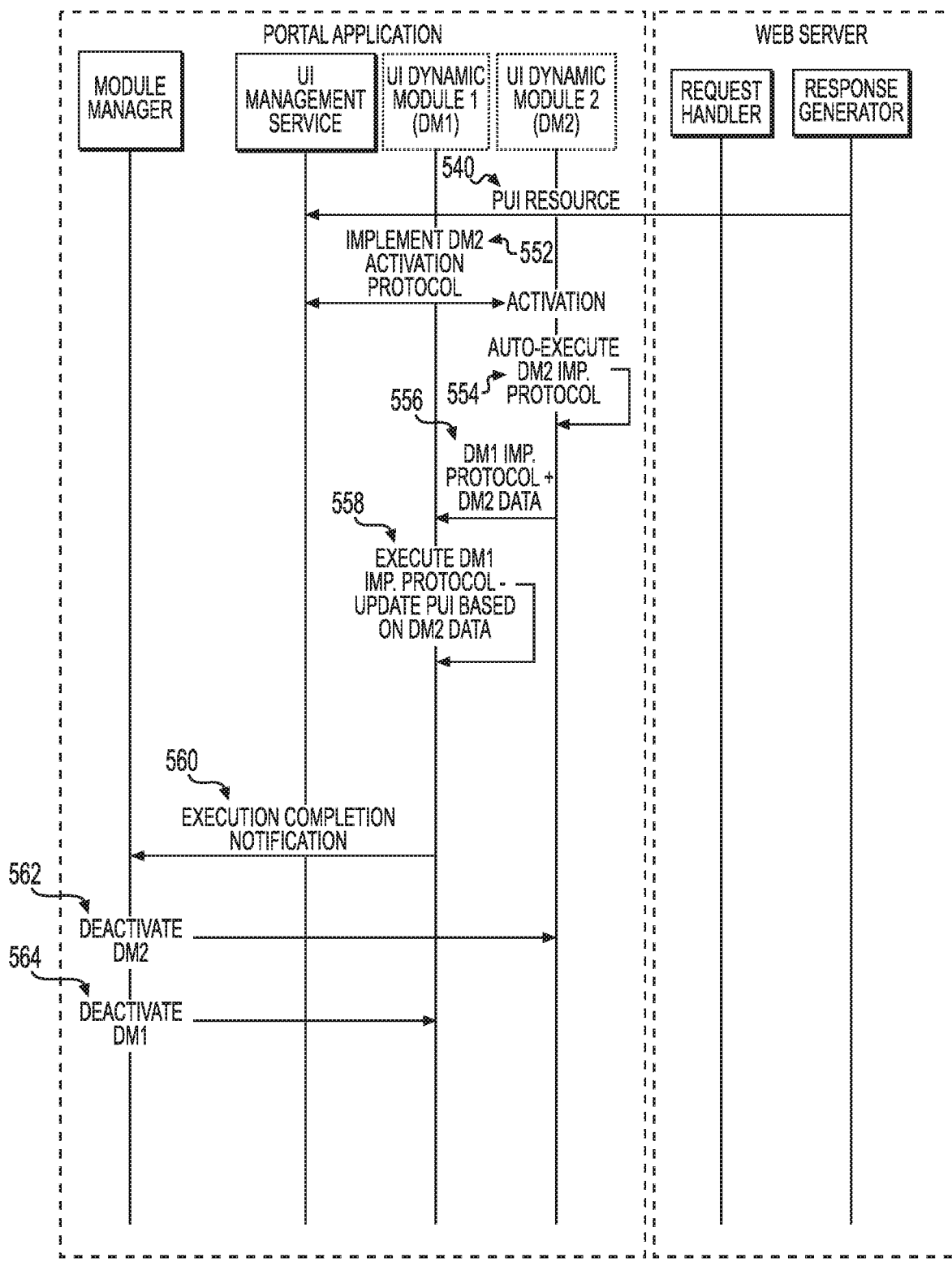

FIG. 1 provides a flowchart of an exemplary method for implementing applications from a virtual disk on a just-in-time basis. FIGS. 2A and 2B provide a more detailed sequence diagram for the method of FIG. 1 that includes accessing and implementing a virtual disk and generating application launch instructions. FIGS. 3 and 4 are flowcharts of exemplary methods for generating instructions for launching applications according to network and local launching protocols that may be incorporated as part of the method of FIG. 1. FIGS. 5A and 5B provide a more detailed sequence diagram for a method of updating a launch and download status for a selected application in a portal application.

Figure 6:
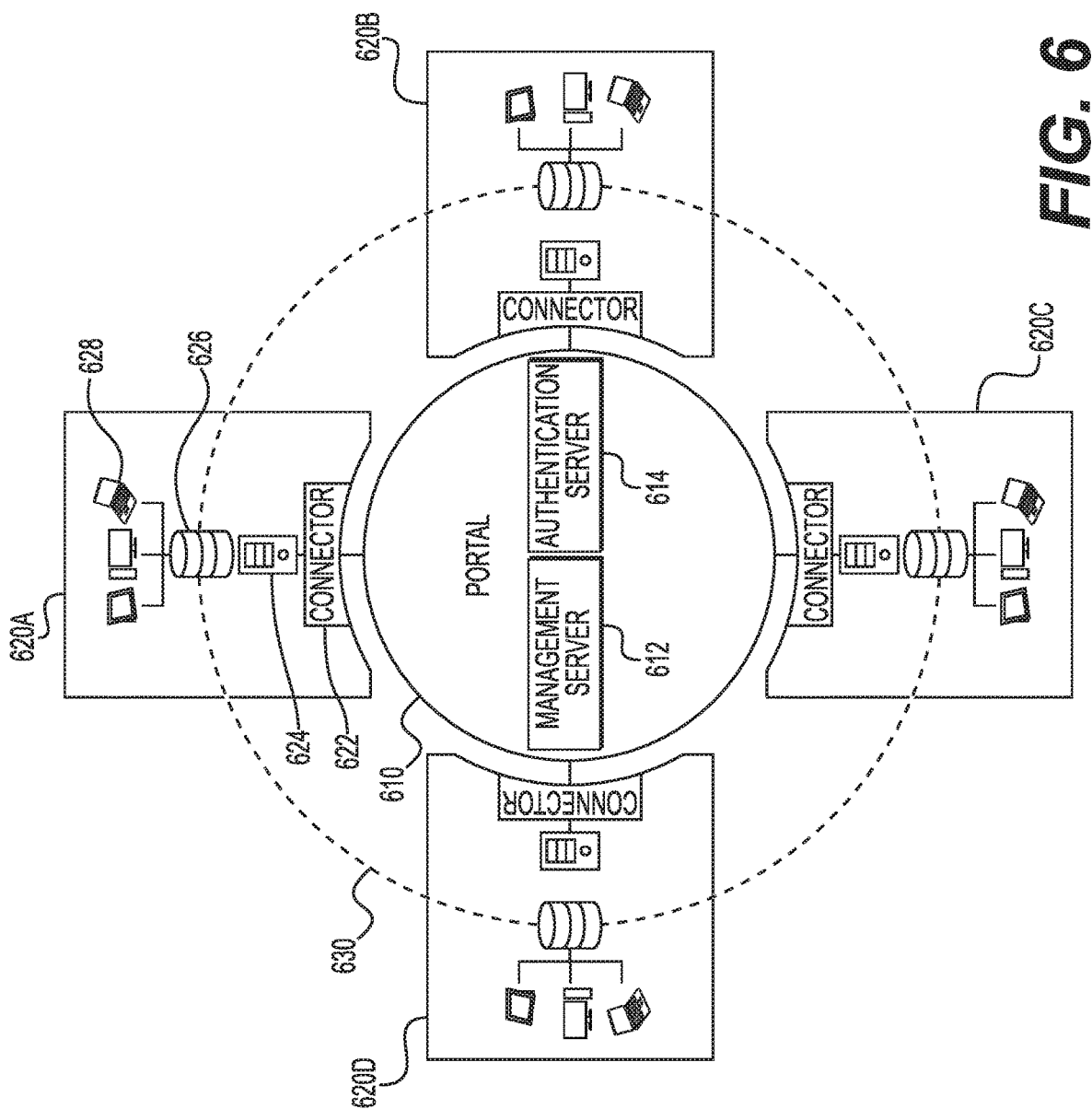
FIG. 6 is an exemplary illustration of system components for implementing applications on a just-in-time basis.
Figure 7A:
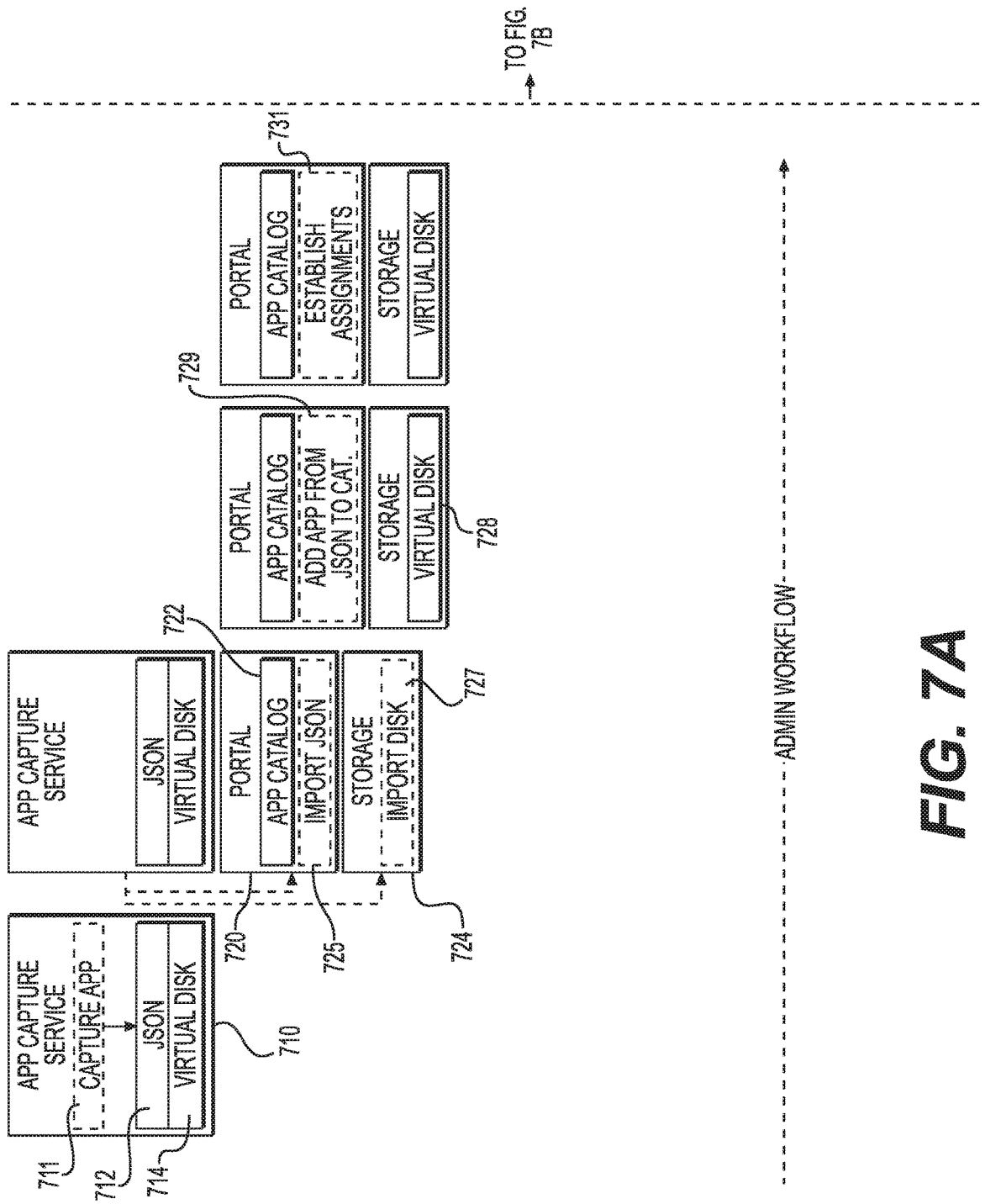
FIGS. 7A and 7B provide illustrations of exemplary workflow progressions of exemplary system components that implement applications on a just-in-time basis.
Figure 7B:
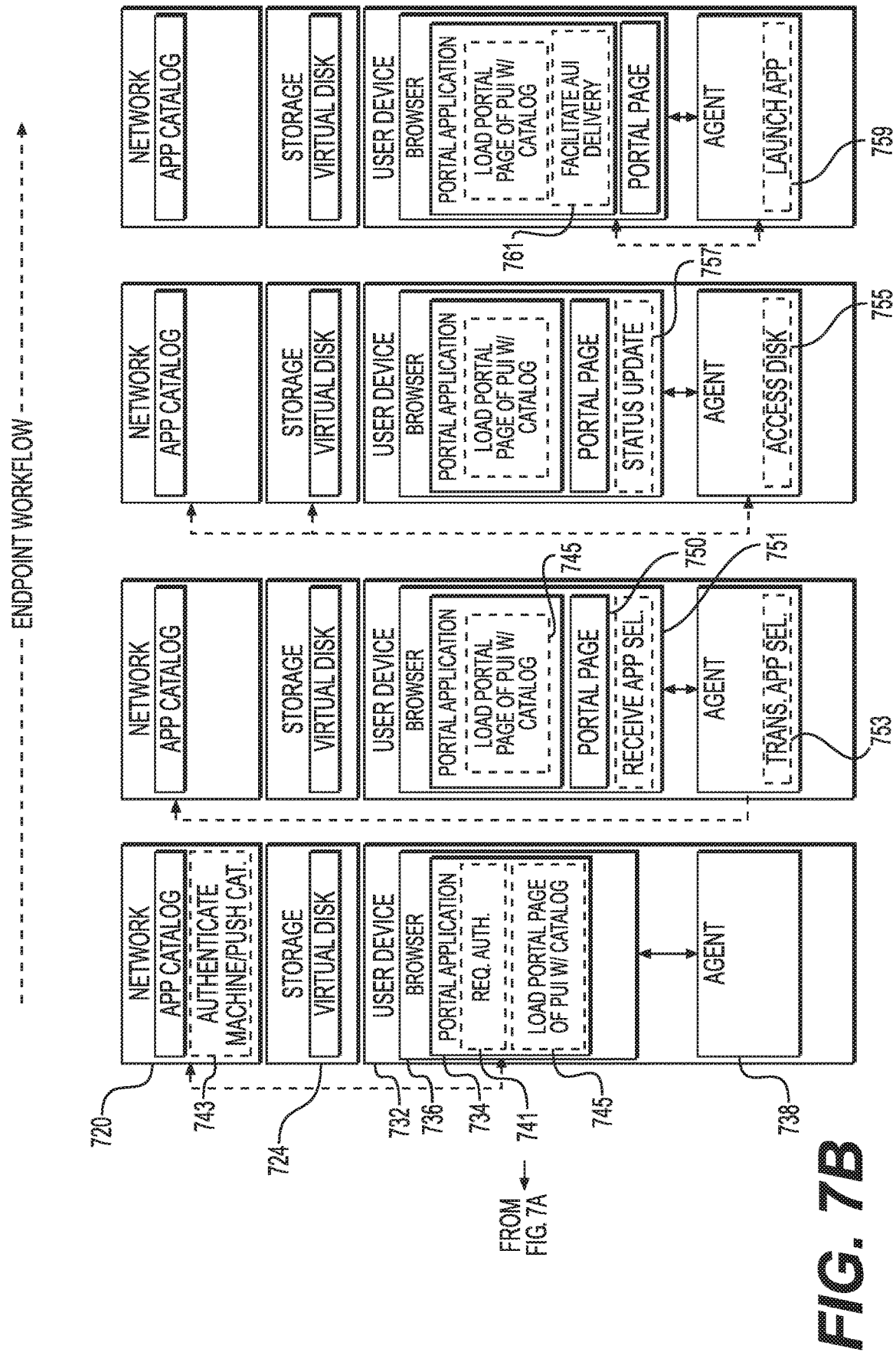
Figure 8:
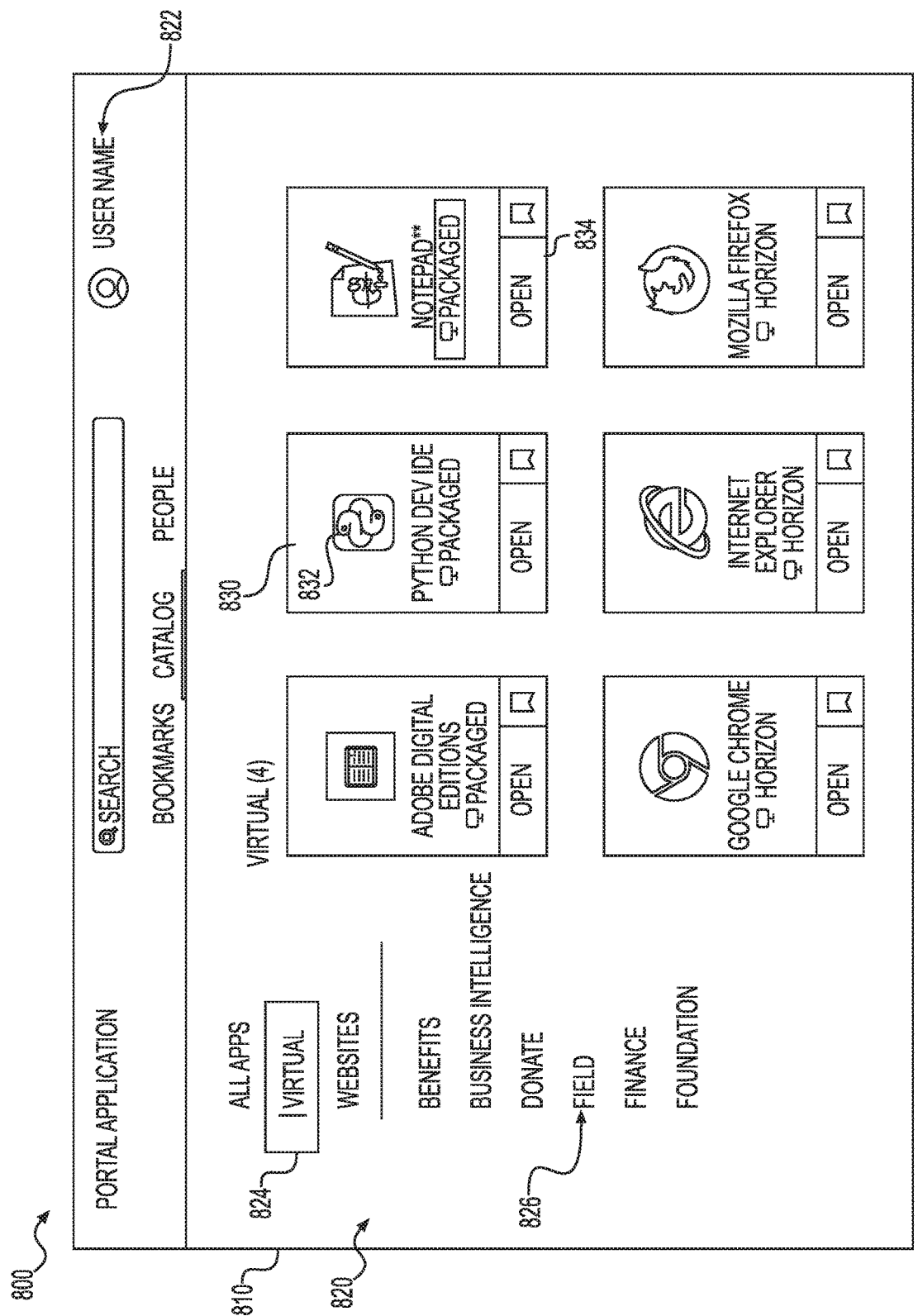
FIG. 8 illustrates an exemplary PUI for implementing applications on a just-in-time basis.

FIG. 6 provides an illustration of exemplary system components for performing the methods of FIGS. 1-5. FIGS. 7A and 7B provide illustrations of exemplary workflows executed by exemplary system components performing the methods of FIGS. 1-5. In addition, FIG. 8 illustrates an exemplary PUI that displays a catalog of applications that may be selected through the PUI to be implemented on a just-in-time basis.

Turning to the flowchart of FIG. 1, stage 110 includes implementing a PUI on a user device. In one example, stage 110 includes a user logging on to the operating system of the user device and subsequently logging on to a portal through a portal application on the user device. In one example, the portal application is loaded through a browser to provide the PUI, and the user logs on to the portal via a username and password credential input page provided by the portal application. Other examples for a user logging on can also be used, such as various biometric identification techniques, or using a single-sign on process that does not require any additional input from a user beyond a system login, such as when the user is in a trusted environment. Upon logging on to the portal, the portal, through the portal application, can present a catalog of entry points that each represent an application assigned to the user.

At stage 120 of the method, a selection of an application can be received on the user device through the PUI. In one example, a user can click on a selectable option that is in the form of a link displayed on the PUI in one example. The link defines an entry point for the selected application, and can be associated with an underlying information package that enables application options to be expressed and communicated to an agent operating on the user device.

In stage 130, a virtual disk corresponding to the selected application may be accessed according to user permissions and a connection status between the user device and the portal. The permissions and entitlements can be expressed in a use-policy specific to the user for the selected application. The virtual disk can include one or more files from a host file system, which can appear as a single hard disk to a guest operating system. The virtual disk can also be limited to the selected application rather than including unrelated applications. In one example, a host file system may be maintained by, for example, by a portal or a distributed file system ("DFS") that a user device may connect to. The operating system of the user device fulfilling the role of a guest operating system with respect to the host file system maintained by the portal or the DFS. In another example, a virtual disk can be copied or moved between different file systems. In one example, a virtual disk may be embodied by a .vhd file or a .vmdk file.

At stage 130, an agent on the user device can validate a link to the selected entry-point (selected application). The link can be a uniform resource locator ("URL"). The validation can include the agent verifying a signature and timestamp of the link using a public-key certificate. Further, the agent can verify if a user that has logged on to the operating system of the device is the same as a user that has logged-on to the portal. The agent can record the entry point for the selected application as selected, and access a virtual disk corresponding to the selected application.

For a first-time use of a selected application, accessing a corresponding virtual disk in stage 130 can include an agent locating the virtual disk in a storage component external to the device. The agent can then attach the virtual disk to the user device. In one example, attaching by the agent can include the agent creating a logical path between a storage node in the virtual disk and an operating system on the user device. As a result of attachment, the virtual disk can appear to the OS of the user device as a physical hard disk drive. In this example, the agent can attach the virtual disk to the user device over a network by creating a logical path to the OS from a DFS share, such as a remote assembly share. Alternatively, with respect to this example, in order to attach the virtual disk, the agent can create the logical path from the OS to a local virtual disk file on the user device. In another example, a virtual disk can persist in a hypervisor-managed data store, and the agent can cause the hypervisor to implement its respective services to advance the virtual disk to user device. In yet another example, the virtual disk could persist as a logical volume stored in a storage area network that an agent creates a logical path between the volume and the OS.

The accessing process may be carried-out in the same way by the agent every time an application is selected, based on entitlements assigned to the user by an admin, in an example. In another example, the agent can access the virtual disk by locating a local copy of the virtual disk on the user device and attaching the copy. The copy of the virtual disk having been downloaded, as a result of a previous selection, and during an ensuing implementation of, the selected application on user device. Local disk caching and access can also be controlled or limited by user entitlements assigned by an admin.

The connection status between the user device and the portal can dictate how the virtual disk is accessed. In one example, assigned entitlements for the user may specify a virtual disk for a selected application is always required to be accessed from an external storage component regardless of whether a copy of the virtual disk is available on the user device. In another example, the user device may be logged on to the portal but network traffic-based rules (bandwidth restrictions) included in a user's assigned entitlements dictate use of a local copy, if available, instead of the virtual disk on the storage component. In another example, where a local copy of the virtual disk is on the user device, the local copy can be accessed regardless of whether the user device is logged on to the portal. In yet another example, the agent on the user device may be required by the user entitlements to access a virtual disk from the external storage component and download a copy of the virtual disk as long as the user device is logged on to the portal.

Stage 140 of the method can include generating instructions for launching the selected application according to a type of disk access occurring in stage 130. In one example, where a virtual disk is accessed locally, an application launch executable ("launch executable") required for launching the application can be stored within a local copy of virtual disk, and by extension stored locally on the user device. An agent, knowing that the virtual disk will be accessed locally, can generate local protocol instructions that specify the location within the virtual disk where the launch executable will be stored and executed. Where the virtual disk is accessed across the network, the launch instructions can specify a series of procedures the app launcher may need to complete in order to access a launch executable for the selected application over a network. For example, the app launcher may be required to pass through one or more authentication processes to obtain access to the launch executable.

In one example, a protocol handler for the agent will take an underlying information package for the selected entry point and can: parse the information package; look up available associated use-policy options; check if a local copy of a corresponding local disk exists; start a download thread; and pass a virtual disk port to a mapping service for the agent. In one example, passing of the port is done indirectly when a management service for the agent accesses (locates and attaches) the virtual disk, and notifies the mapping service of the attachment. The mapping service may process and prepare the virtual disk for implementation.

At stage 150 of the method, the accessed virtual disk can be implemented on the user device by an agent operating on the user device. In one example, implementation of the virtual disk can include causing the virtual disk to be unpackaged and run as a virtual machine on the user device. In one example with the virtual disk implemented, any input or output that comes from the OS of the user device may be serviced out of the now implemented virtual disk.

In stage 160, the selected application can be launched from the virtual disk prior to or concurrently with the portal application facilitating a delivery of an AUI of the selected application according to the application launch instructions. Implementation of the application can include a window native to the application being displayed as the AUI on user device, or in another example, the AUI can be run within the portal application. The latter example may be implemented for applications including file sharing, video chat, conferencing, remote assistance, or screen-sharing applications.

Either of the above implementations can be executed on a just-in-time basis that does not require waiting on local installs (full or administrative) or uninstalls of the selected application by the user device. Further, creation of a native install footprint on the user device may not be required. Applications can launch immediately locally or across a network according to the launch instructions. Further, logon delays, caused for example by on-logon policies downloading and installing installers, such as MICROSOFT Installers ("MSIs"), are minimized or eliminated. This feature flows from the provision of a portal application supported by a portal server. The portal can be a cloud-native, evolved infrastructure that supports application-onboarding, entitlements, leasing, cataloging, and user-self-service interfaces.

FIG. 2A provides an example sequence diagram including stages for accessing and implementing a virtual disk described in FIG. 1, and showing interactions between various system components. At stage 200, a portal application operating on a user device implements a respective PUI including a catalog of applications that may be selected through the PUI. In one example, the portal application communicates with a portal to obtain information that may be utilized to render the PUI. The portal can be comprised of one or more servers and provide an on-cloud control plane, with on-premises connector services that connect an on-premises active directory domain controller to a cloud. Admins for the portal can onboard applications that can be sent to user devices through the portal application. Communication between the portal application and the portal can be facilitated over a network, such as the internet.

In stage 208, the portal application issues a notification that the PUI has been implemented. The notification can be sent to a web server of an agent operating on the user device. The web server is local to the user device. In one example, the web server is a component of the agent and embedded on the user device. The web server may use Hypertext Transfer Protocol (HTTP), or other protocols, to make requests from and serve files to the user device. In one example, the web server can be implemented to only service requests from local clients and be systemically protected from external input by local firewall rules. Thus, the web server can be run locally and constitute a customized non-off-the-shelf web server product. In particular, the web server can be a custom implementation of an HTTP protocol and configured to circumvent a browser's standard caching and script-processing behaviors to carry out methods described herein The agent can be an application dedicated to management functionality, such as enforcing device-level compliance rules established at the portal. The agent can operate on the user device in conjunction with other applications, such as the portal application, that performs application-specific compliance enforcement. The agent can be a portion of an operating system for the user device. In another example the agent can operate in an application layer of the device. For example, the agent can be a dedicated application or other software installed on the device that can monitor and manage data, software components, and hardware components associated with the device. Further, the agent can monitor and control functionality and other managed applications on the device. In one example, the agent may be embodied as an application on the user device, such as VMWARE's APP VOLUMES.

At stage 210, the user can select an application on the PUI, or more specifically select a link in the portal application corresponding to the application. The selected link can define an entry point for the associated application within the PUI. An application may be any type of application, such as: a productivity application like MICROSOFT WORD or POWER POINT; a communication application like OUTLOOK, an instant messaging application, or a video chat application; an enterprise customized work application; a file or screen-sharing application; or a remote assistance application. In stage 212, a protocol handler can receive a notification that a selection has been received. The selection notification can include an identification of the application selected and information included in an associated link.

The communication from the portal application to the protocol handler in stage 212, which is local to the user device and therefore does not go out into a network, incorporates a custom protocol. In one example, when the agent is installed on the user device, the agent registers itself as the handler for the custom protocol so that the custom protocol is called as a launch for the agent. As a result, the portal application, or browser on which the portal application is being run, can hand off substantially all processing associated with launching the application, to the protocol handler.

At stage 214, a protocol handler processes the selection of the application. As discussed with respect to stage 212, the link can carry a custom protocol that effectively defines and is implemented as an agent launch scheme. The custom protocol can be embedded in an information package underlying the link; the information package being provided for example, in the form of a URL. The protocol handler works on the information package that in addition to the custom protocol, can be self-contained and include all the instructions the agent needs to work with the virtual disk that corresponds to the application for the selection received in stage 210. For example, the information package can specify a local folder where a virtual disk is located on the user device, a port to the virtual disk that is out on the network in a storage component or the portal, or configuration options such as access right away or detach on logoff.

In one example, an information package can have the following form:
applicationlaunch://portal/<appguid>?query-params
The query-params component of the information package represents parameters that can be queried for ("query parameters" or "QP"), and used to express and communicate application options to the agent. Some exemplary query parameters are provided in Table 1.

TABLE 1

Query Parameters for Application Link Provided in PUI

| QP NO. | REQUIRED | PARAMETER |
|---|---|---|
| [1] | Y | user=<domain\username> |
| [2] | Y | path=<stack-vhd-dfs-path> |
| [3] | N-OPTIONAL | policy-options=<admin-config use-policy options> |
| [4] | Y | nonce=<nonce> // Agent's challenge |
| [5] | Y | ts=<timestamp> // generated by server |
| [6] | Y | sig=<signature> // verified by Agent, using cert |
| [7] | Y | entry-point=<path> |

The query parameters can be established in the information package underlying a link at the time an application is captured. Application capture is discussed in more detail with reference to FIG. 7A. The query parameters can be processed by the protocol handler to make an initial determination of use-policy options associated with the selected application. Certain query parameters can be included in every information package as required information. For example, QP Nos. [4] and [5] in Table 1 can include values for timestamp and signature that can be used by the agent to verify that a link was created by the portal. As shown in Table 1 with QP No. [3], some query parameters such as policy options may be optionally embedded in the information package. However, in one example, aspects of an implementation of a selected application that are derived from the use-policies may be required to be embedded in the information package, as is the case with QP No. [7].

In one example, QP No. [7] may include a path for accessing an application launch executable ("launch executable") that can be run as part of launching the selected application on the user device. In one example, the information in QP No. [7] can be subject to whether the selected application will be launched from a local copy of a virtual disk or from a virtual disk over a network. The protocol handler, in stage 214 can process the information in QP No. [7] and generate initial app launch instructions that reflect the procedures the agent must execute to access and implement the launch executable.

In one example, the value for the parameter in QP No. [7] can indicate the selected application is going to be launched from a virtual disk over a network. As a result, the protocol handler can generate initial app launch instructions that direct an app launcher to carry out one or more authentication processes in order to access the required launch executable. Instructions for completing authentication processes with the network-accessed virtual disk, a remote storage share that includes the network-accessed virtual disk, the portal, or a combination of these components can be generated in the case of a network launch. In one example, various authentication processes may not be required to obtain access to a launch executable where a virtual disk corresponding to the selected application is stored locally on the user device. In this situation, the initial launch instructions may accordingly not include instructions for locating a launch executable or over the network, for example in the form of a logical path, or for carrying out one or all of the authentication processes previously mentioned.

In stage 216, the protocol handler provides the processed selection to the web server of the agent. In one example, the web server or the protocol handler can validate a link for a URL by verifying a respective signature and timestamp on the link. Further, either of the web server or the protocol handler can verify if a user that has logged into the device via a system log on, is the same as the user that has logged on to the portal via the portal application. In addition, either of the web server and the protocol handler can record an entry point used to select the application as selected.

At stage 218 the protocol handler communicates with a local disk manager, a mapping service, and the portal to determine how to locate and access a virtual disk corresponding to the selected application, in order to implement the selected application. The virtual disk can be specific to the selected application. Implementation of the application can include launching the application from the corresponding virtual disk, and delivering an AUI of the selected application on the user device. The communications between the agent components and the portal inform the protocol handler of a use-policy, permissions, and entitlements associated with the user with respect to the selected application or bundle of applications. In one example, communications with the portal can include the protocol handler checking use-policies and procedures derived from the use-polices initially determined in stage 214, for example with QP Nos. [2] and [7]. In stage 218, these initially determined policies and derived procedures can be checked, and updated if necessary, in view of the most current use-policies persisting on the portal for the selected application with respect to the current user.

With respect to the agent components that can communicate with the protocol handler in stage 218, the local disk manager can download a virtual disk from an external source such as a storage component or the portal. The local disk manager can store a downloaded virtual disk locally on the device, for example in a cache folder, such that the agent may repeatedly access the downloaded virtual disk and implement a selected application from this local virtual disk. The mapping service may include a file system filter driver that works above a storage system, can provide data storage, and intercept requests targeted at a file system or another file system filter driver. In one example, the mapping service can extend or replace functionality provided by an original target of a request.

In one example, the mapping service can additionally maintain an application map that includes a list of applications and use policies for each application specific to the user. The protocol handler may refer to the application map to determine how a virtual disk for a selected application can be accessed for the user. An exemplary application map is provided in Table 2. With regards to Table 2, a value for Application/Application Bundle can be a unique ID for an application. The Policies column can be populated with admin-configured use-policy options, and Selection Log column can reveal if and when a user attempted an open selection for a given application. The Dir. Storage column can, in one example, include a value of a share path for a DFS for the virtual disk corresponding to the selected application. Values for Local Path can reveal a local path on the user device for locally stored virtual disk; where no value in this column indicates a local copy of the virtual disk is not available.

TABLE 2

Exemplary Application Map

| Map No. | Application/Application Bundle | Policies | Selection Log | Dir. Storage | Local Path |
|---|---|---|---|---|---|
| 1 | Sales Tracker (OR GUID for Sales Tracker) | [Access-Portal logon, open selection] [Launch type-No user option] [Launch-Portal open selection] [Open Selection Display-Open; No external entry point] [Download-No] | Access/ Launch/ Open_ DATE | Site 001B | |
| 2 | MICROSOFT Work Bundle- ACCESS, POWERPOINT, EXCEL (OR GUIDs) | [Access-Portal logon, open selection for first access; On-premises storage connection for subsequent access] [Launch type-No user option] [Launch-Any (portal or system) open selection] [Open Selection Display-Open; One external entry point] [Download-No] | Access_ DATE Open/ Launch_ DATE | Site 001A | |
| 3 | MICROSOFT WORD | [Access-Portal logon, open selection for first access or no copy; System logon for subsequent access] [Launch type-User option] [Launch-Any open selection] [Open Selection Display- Open Online (portal); Open Local; One external entry point] [Download = Yes-Download/ update with portal logon and any open selection] | Access_ DATE Local Open_ DATE Online open_ DATE | Site 001A | C/: folder/ APP3 NAME |
| 4 | Time Tracker | [Access-Portal logon for first access OR no local copy; System logon for subsequent access] [Launch Type-Auto or User option] [Launch-On system logon; Any open selection] [Open Selection Display- Open Online (portal); Open Local; Two external entry points] [Download-Yes-Download/update with portal logon] | Access_ DATE Local Open_ DATE Online open_ DATE | Site 001A | C/: folder/ APP4 NAME |

In one example where the permission scheme for disk access is set to portal logon and open selection, the agent does not access a virtual disk until a successful portal logon is reported to the agent and a selection of the application is made. This policy may be established where the portal application and portal logon are implemented through a browser. Further, with an open selection condition, the agent will not access the virtual disk until the user clicks an [Open] link on a catalog page of the portal application.

Three disk access settings can use the above permission scheme differently. The first disk access setting can be an online only setting, as in the case for Map No. 1 in Table 2. The agent will only access the virtual disk from the storage component, which the user device must be connected to through a network, although not necessarily connected to a portal. The agent can maintain access and continue to implement the virtual disk after a user logs off of the portal or closes the portal application. In a second disk setting, the access and implementation of the virtual disk only persists as long as the user is logged on to the portal. In either the first or second disk access setting, the virtual disk will not be downloaded or accessed locally. Further, for either the first or second disk access setting, where a user logs off of the operating system (system log of), the agent will no longer access (be detached) the virtual disk. The above permission scheme may also be used for a third disk access setting where portal logon is required, but the virtual disk can be downloaded and accessed locally, at least after a first time a corresponding application is selected.

In one example, one of the three disk settings may be implemented as a result of a network "location" of a user. Examples of network locations can include a user on a public internet (for example VPN'ed into an enterprise network) or directly connected to an enterprise intranet (inside a firewall). The portal can determine a user's network location and mode of connection, and make this information available to the protocol-handler.

In another example, a permission scheme for disk access is set to only require a system logon, as with Map Nos. 3 and 4 of Table 2. With this permission scheme, a portal logon is not required unless a virtual disk is not available locally, then the agent will access the virtual disk via the external storage component which will require a portal logon. However, the agent will cause the local disk manager to store a copy of the virtual disk in a designated local folder when it is accessed via the storage component. With subsequent application selections, the virtual disk is available locally with only a system logon, and the management service will access the local virtual disk copy. In still another example, a user may choose where a virtual disk is accessed via a portal page of the portal application. In yet another example, a launch of a locally available virtual disk, can still require a portal logon in order to update use-policies specific to user as a check to prevent use of applications locally by a no longer entitled user.

In addition, at stage 218 the protocol handler can communicate with the portal to obtain or update enterprise use-policies for a current user of the device that is logged on to the portal through the user device. The use-policies will correspond to the use-policies included in the application map for the selected application where the selected application has been previously implemented during a current user session, or a prior user session where use-policies for the application permit carry over from a previous user session. A user session can start when a user logs in into an operating system on the user device, otherwise known as a system logon. The permission/entitlement/use-policy information can specify whether applications may be downloaded for the user onto the user device in general, and specifically with respect to the selected application. The use-policies for an individual user or group of users may be established through the portal by an administrator.

An example of a use-policy update can result from an admin that no longer wants an application or bundle of applications to be used locally, changing the use-policy through a UI for a portal. Accordingly, the agent will mark the local virtual disks for deletion and delete the virtual disk(s) file right away if not currently being accessed, or if currently being accessed, later when a current portal or user session ends.

In one example, the protocol handler may communicate with the portal based on a response from the local disk manager and the mapping service. In one example, where a selected application has not been implemented on the user device, as indicated by a review of the mapping service, the protocol handler can communicate with the portal. In another example, where a predetermined time has elapsed since the last time a virtual disk corresponding to the application was accessed through the portal, as indicated in the application map, the protocol handler can communicate with the portal to check for any updates to the application.

Stage 220 of the method can be divided into sub-stages 220A, 220B, 220C, which can be performed by the protocol handler simultaneously or in any order. Each stage can include some communication or implementation of the method that is responsive to the information received by the protocol handler in stage 218. In one example, at sub-stage 220A, the protocol handler can communicate with a management service to request a virtual disk corresponding to the selected application be accessed, and include instructions or a location for accessing the virtual disk across a network. In another example, the protocol handler can provide the management service with instructions that specify that the virtual disk is to be accessed locally from the user device.

Even where the selected application is updated from a version that can be implemented through a local protocol, the use-policies provided to the protocol handler and followed pursuant to the communication with the management service in sub-stage 220A, may specify that the virtual disk is to be accessed locally due to current network traffic. Thus, even in situations where an application has been updated on the portal, the use-policies can set a threshold for acceptable bandwidth consumption for updating the virtual disk that will be accessed by and implemented on the user device according to different levels of network traffic.

At stage 222A, the management service can access the virtual disk in accordance with the request provided in stage 220A. Accessing the virtual disk can include, in general, locating the virtual disk from one of a plurality of locations, and attaching the disk to the user device. In one example, where the management service accesses the virtual disk consistent with a local application launch instruction, the management service locates the virtual disk in a designated folder where the virtual disk was downloaded by the local disk manager. In another example, the management service can access the virtual disk via the portal in accordance with a network application launch protocol as described in more detail with reference to FIG. 3.

At stage 224, the management service can provide the mapping service with a notification that the virtual disk has been accessed (attached) with the completion of stage 222A. The mapping service will update or populate the application map with details of the access including: a date and time of disk access; whether just a system or a system and a portal logon occurred; any conditional policy of a use-policy that was implemented; and any and all use-policies assigned to the application corresponding to the virtual disk having been accessed. In response to the disk access notification, the mapping service can implement the virtual disk in stage 226.

As stages and 222A, 224, and 226 progress, the protocol handler can provide the local disk manager with a request to download a copy of the virtual disk corresponding to the selected application in sub-stage 220B. In stage 222B, the local disk manager can locate a copy of the virtual disk that is being or is to be implemented in stage 226. The protocol handler can determine whether it will provide a request for a virtual disk download based on the information including the application/user use-policies obtained in stage 218. Thus, sub-stage 220B and stage 222B are indicated with dotted lines to indicate these stages may be optional or conditioned on the use-policies. The use-policies can be received from the portal or derived from the application map in stage 218.

In one example, the local disk manager can locate and download a compressed version of the virtual disk that includes a file without a file system attachment/mount. As compared to using an MSI, access through the compressed virtual disk copy for a local run of a corresponding application provides a lower network transfer size compared because the implemented application's content footprint is limited to an installed set. For example, only MICROSOFT WORD and POWERPOINT may be implemented, instead of an entire MICROSOFT OFFICE product-suite that would have to be installed using an associated MSI.

Concurrent or after stages 220A-226 and stages 220B and 222B, the protocol handler can provide an app launcher with application launch instructions in stage 220C. The app launcher can be an application managed by the agent or a functional component of the application that is the agent. The app launcher can allow a user to open various applications from within the agent, or with the portal application through the agent. Launched applications may be able to operate in a virtual environment created by the app launcher. In some examples, the app launcher can function as a replacement interface for the portal application or browser in which the portal application is being run. Such may be the case that a "home screen" of the portal application may be supplied by, replaced by, or diverted to, an interface provided by the app launcher.

In response to receiving the app launcher instructions in sub-stage 220C, the app launcher can request or register for an app launch ready notification with the management service is stage 222C. As noted above, the app launcher instructions may specify a network or local protocol for launching the selected application. The request or registration can be a standing request that causes the management service, whenever a change in launch status occurs, to notify the app launcher. In one example, the app launcher can specify that a notification is only to be sent when the application is ready to be launched from a corresponding virtual disk.

FIG. 2B provides an example sequence diagram including stages for launching and implementing an application described in FIG. 1 and showing interactions between various system components. It will be understood that FIG. 2B can represent a continuation of the sequence illustrated in FIG. 2A. Accordingly, stage 226 is illustrated in FIG. 2B in order to indicate that stage 227 can occur, in one example, temporally after stage 226. It will also be understood that one or a series of activities may be carried out, including a current user session ending and a subsequent user session being initiated, on the user device between stage 226 and stage 227.

In another example, stage 227 of the method of FIGS. 2A and 2B may be implemented as an immediate result of the application selection received in stage 210. Thus, stage 227 can be implemented currently with, or immediately after the selection notification being sent to the agent in stage 212. Further, stage 227 may trigger one or a series of procedures carried out by the agent and the portal application as part of, for example, stage 228 and stage 230, any time during or after any of stages 212 to 226. In another example, stage 227 can be implemented in a loop until the portal application is provided with an update from the web server regarding a launch status or a download status.

At stage 227, the portal application can communicate with the web server of the agent to request an update on a launch status of the application selected or download status for a virtual disk in stage 210. In one example, communication between the portal application and the web server can be facilitated by the portal application being run through a web browser. Further, communication can be in the form of script requests and responses as discussed in more detail with reference to FIGS. 5A and 5B.

In response to receiving the request, the web server can start continuously polling the app launcher and the local disk manager for updates on the status of respective activities being performed. In stage 230, based on criteria specified by the management service or the portal through the portal application, the web server can determine if the information provided by the app launcher and the local disk manager include data that needs to be provided to the user of the user device.

At stage 232, the portal application can display the information provided in any update it determines meets a threshold for conveying the information to a user. In one example, the portal application can modify a page of the implemented PUI previously shown on the user device to provide an update. In one example, an update can appear as text and an advancing progress-bar. In still another example, a display of the update status can include the portal application generating a new window, such as a pop-up window, and including the received information in the new window.

At stage 234, the mapping service can notify the management service that implementation of the virtual disk has been completed. As a result of the virtual disk having been implemented, the application corresponding to the virtual disk is ready for launch. In response to the notification with regards to the virtual disk, at stage 236, the management service issues an application ready to launch notification to the app launcher and the web server.

With the broadcast of the notification in stage 236, procedures by the app launcher in sub-stage 238A and by the web-server in sub-stage 238B can be executed concurrently. At sub-stage 238A, the app launcher can locate a launch executable according to the app launch instructions provided by the protocol handler in stage 220C. In one example, the app launcher can complete one more authentication processes with the portal, network-accessed virtual disk, and the remote DFS share that includes the virtual disk, in order to locate and execute the launch executable over the network. In another example, the app launcher can locate the launch executable locally, for example in the virtual disk stored in designated folder on the user device, or another local folder on the user device. The folder being identified in the application launch instructions generated in stage 220C.

At sub-stage 238B, the web server can provide the portal application with a status update that indicates the application is ready for launch. In response, the portal application can implement certain procedures at sub-stage 240B to facilitate the delivery of a respective AUI of the selected application. In one example, the AUI is provided as a new window in the user device and the portal application facilitates delivery by either allowing the AUI to open in front the PUI, or minimizing the PUI as the AUI opens on the user device. In another example, in the case of a screen share, remote assistance, or file share application, the portal application facilitates delivery of the AUI by implementing the AUI within the PUI being implemented and maintained by the portal application. Delivery of the AUI on the portal application will be dictated by the notice provided by the web server, which may include information based on the launch ready status supplied by the app launcher.

In one example, the portal application can provide a status update in stage 240B with respect to a download status in the case where a copy of the virtual disk is still being downloaded as the AUI is delivered. The download status update can be provided in the same manner as in stage 230 just prior to delivery of the AUI. In one example, the portal application can continue to provide download status updates while the selected application is being used by a user. Where the AUI is separate from the PUI, the PUI can be delivered briefly over the AUI and the update displayed. In another example where the AUI is implemented through the PUI, the download status update can be delivered within the AUI.

At stage 241, the protocol handler can request an update from the web server with regards to launching the application. In one example, the protocol handler can request the launch status any time after stage 220. At stage 242, the web server can provide a launch completion notification to the portal application. In one example, the web server can limit the notifications provided to the protocol handler to just completion notifications. The protocol handler can establish this policy with the web server and recognize when a response is not received after a first predetermined period of time, the application has not been launched. In another example, the protocol handler may recognize that a second predetermined period of time has elapsed longer than the first predetermined period of time, and reissue the requests and instructions from sub-stages 220A, 220B, and 220C.

Turning to FIG. 3, a flowchart for an exemplary method for accessing a virtual disk and generating an instruction for launching an application across a network is illustrated. At stage 310, a determination can be made as to whether a permission to download a virtual disk corresponding to the selected application, has been assigned to a current user that has selected the application. Permissions and entitlements may be set by an admin for a portal as noted above. Where it is determined that the permission has been assigned to the user, a determination as to whether a copy of the virtual disk is on the user device may be made in stage 312.

Where the user device includes a copy, the agent can execute a local disk access process 400 discussed in more detail with reference to FIG. 4. Otherwise, a setting for downloading a copy of the virtual disk corresponding to the selected application can be set to active by the agent in stage 314. Each of stages 310, 312, and 314 may be performed by the protocol handler as part of stage 218, previously discussed.

It will be noted that stages following stages 310 and 314 may occur where a user device is connected to a DFS share, in which a successful logon to a portal of the network through the portal application has occurred. In one example, a successful logon to the portal also provides connection to an on-premises file system or a remote file system directory via a network path. The onsite file system that may be unavailable for one or more reasons, may be replicated in total or in part on the remote directory. In one example, the agent can identify and locate the virtual disk from the network. The virtual disk can be accessed for launching the corresponding application.

At stage 316, a virtual disk that is to be accessed across a network, for example from an on-site or remote file system, may be identified. Once identified, the virtual disk can be attached in stage 318. Stages 316 and 318 can define a virtual disk access, as in stage 222A, according to a network disk access protocol.

At stage 320, network-based application launch instructions can be generated, as in sub-stage 220C, in-line with the accessing of the virtual disk across the network. These instructions can be implemented by the app launcher and included in a resource response that is returned to the portal application via the web server. In one example, the portal application can render an AUI within the portal application to facilitate AUI delivery based on these embedded instructions. In another example, the network launch instructions can also specify whether the selected application continues or stops when the portal application closes. The network launch instructions can also specify if the virtual disk will remain attached for one or more of these scenarios. The network launch instructions will be included in some form in the resource response that is returned to the portal application. As a result, the resource response can be used to direct a browser to generate notifications of the policies that will be applied to selected applications being implemented based on different actions. For, example, such policy notifications can be displayed if the user closes the portal application, closes the browser, or logs off of the portal. In another example, the launch instructions can direct the app launcher to complete various authentication processes in order to locate and execute a launch executable.

The agent can check the download permission setting for the virtual disk corresponding to a selected application in stage 322. If the setting is active, a copy of the virtual disk can be accessed and downloaded by the local disk manager in stage 324. The virtual disk that is downloaded can be a compressed version of the virtual disk capable of being stored within a virtual disk, for example in a root folder. Once a download has been initiated, or if the download setting is not active, the agent can implement the disk in stage 326.

FIG. 4 includes a flowchart for an exemplary method for accessing a virtual disk and generating an instruction for launching an application locally. The stages can include accessing and launching an application where a current user is permitted to use a selected application where the user is online and connected to an on-premises DFS share, but not logged on to a portal. At stage 410, the local disk manager of the agent can open a connection with a designated local folder on the user device. The designated folder can be any folder locally stored on the user device. In one example, the designated folder can be a cache folder of the user device. An operating system may enforce certain data management policies with respect to the designated folder, such as clearing the folder on a periodic basis or deleting specific content that has not been used for a predetermined period of time.

At stage 412, the agent can search through the designated folder to identify the virtual disk corresponding to the application to be launched and implemented. Once identified, the agent will attach the stored virtual disk in stage 414. It will be noted that stages 410, 412, and 414 define a virtual disk access, as in stage 222A, according to a local disk access protocol.

At stage 416, a local application launch instruction can be generated (as in sub-stage 220C). These instructions can be implemented by the app launcher and included in a script that is returned to the portal application. Based on these embedded instructions, the portal application can facilitate delivery of an AUI for the selected application by accessing an external entry point on the user device that brings up a window for the selected application being launched by the app launcher. In another example, the selected application can be one of a file share, video chat, or remote assistance application and the embedded instructions can cause elements of the AUI to be rendered within the PUI. In another example, the local launch instructions can also specify how or if the selected application is continued or stopped, and whether or not a virtual disk is detached, when a user logs of the of the portal or logs out of the system.

At stage 418, the virtual disk having been attached from the designated folder, is implemented by the agent.

In addition, the methods and systems of the present disclosure can include offline implementations of applications from downloaded virtual disks, as permitted by assigned user entitlements. This can provide an advantage over other solutions, such as web applications, which require internet access at all times during application implementation. The offline functional aspect of the present disclosure is not accompanied with an increased in workload for the user device at the time of a system or portal logon. The download of a copy of a virtual disk can occur when an application is selected and accessed, not when a user is logging on to the user device or the portal. In some examples, the next time a user selects an application corresponding to a virtual disk that has been downloaded, the agent may not access a network resident disk but rather go to the previously downloaded locally available virtual disk. In this situation, a user that is working from home and connected through VPN to an enterprise network can, if appropriate entitlements are assigned to the user, choose to launch an application locally and avoid consuming bandwidth attempting to use a network virtual disk.

Turning to FIGS. 5A and 5B, an exemplary sequence diagram includes additional aspects of the stages of the diagram of FIG. 2B directed toward updating a portal application with launch and download status updates and facilitating a delivery of the AUI. The sequence diagram illustrated in FIG. 5A corresponds to stages 227, 228, 230, 236, and 238B in FIG. 2B, which are directed toward request and response communications between the portal application and the agent for providing the portal application with an update on launch and download progress. The sequence diagram in FIG. 5B corresponds to stages 232 and 240B of FIG. 2B, which are directed toward displaying status updates and facilitating delivery of an AUI through the portal application.

In one example, when a user clicks on a link for an application, the portal application can request that the agent process the information package underlying the link. The request can be made through a browser to a web server that runs as part of the agent, in an example. In another example, where an application is being launched, the web server communicates, through the browser, with the portal application and the code it embodies, to notify the user that a launch of the selected application or download of a virtual will occur or is ongoing.

Turning to FIG. 5A, as noted above, stage 227 of the method of FIGS. 2A and 2B can be implemented in response to the selection of the application in stage 210. In one example, stage 227 of the sequence of FIG. 2B can include stages 510 to 526 illustrated in FIG. 5A. As illustrated in FIG. 5A, stage 210 can specifically include a UI management service of the portal application receiving the application selection. In one example, the UI management service can direct communication between components of the portal application, and cause and manage communications between the portal application and the web server.

At stage 510, the UI management service can provide the processed selection to a module manager. In one example, the portal application can include or embody a page with code that is provided by the portal, and runs on a browser as a portal page. The module manager can be a component of the portal page, for example code provided by the portal, that is implemented by the portal application through the browser. In one example, the module manager is not part of the browser or browser specific, but a component of the portal application provided by the portal. More specifically, the module manager can be returned to be served alongside of the portal page.

At stage 512, the elements of the information package associated with the link of the selected application can be processed and converted into a protocol for activating a UI dynamic module, such as UI dynamic module 1 ("DM1"). In one example, a dynamic module can be provided as code that is created by existing code provided by the module manager. This created code can be executed within a portal page of the portal application.

DM1 can dynamically generate objects within a UI, in an example. In addition, aspects of DM1 and the objects it generates can depend on the type of virtual disk access and the selected application launch. More specifically, the UI objects generated through DM1 will reflect whether a virtual disk is launched locally or over a network, and whether or not a copy of the virtual disk will be downloaded. Therefore, aspects of DM1 can correspond to the type of disk access and application launch, which can vary based on the application selected and the associated information package. In one example, the DM1 can produce an exemplary container or UI display object within the portal application that can inform a user of, among other things, a disk download completion percentage, time until complete disk download, time until a selected application is launched, or a percentage complete of processes required to launch the selected application.

The above aspects can vary based on how the virtual disk is accessed and how the selected application is launched. As a result, the module manager can process portions of the information package for the selected application at stage 512 to determine the components of DM1 and types of UI objects DM1 will cause the portal application to display. In another aspect, implementation of DM1 can facilitate delivery, or provide components, of an AUI as part of an AUI delivery.

In stage 514, the module manager can implement the DM1 activation protocol. In one example, activation can include the module manager generating code that embodies DM1. In another example, DM1 can be a dormant component of the portal page, and activation can include preparing or updating this component to accept data, and be able to package data for display in an object within the PUI.

Stage 516 can include the module manager generating a PUI element that includes a DM1-identifier. In one example, the PUI element is an instance of script that specifies a parameter for data that DM1 will need for implementation. The DM1-identifier provided in the PUI element can associate the specified parameter to DM1 within the created script.

In one example, the specified parameter can correspond to a percentage complete of a disk download or launch process, or a time till full download or launch of selected application. In another example, the specified parameter can correspond to objects or elements that define components of an AUI.

In one example, the module manager can activate multiple dynamic modules similar to DM1. Each of these dynamic modules can represent a different type of update or component of AUI delivery, and require respective data. The module manager can create a PUI element for each dynamic module that specifies a parameter of data needed and ties the parameter to an identifier corresponding to a respective dynamic module.

In stage 518, the module manager can provide the UI management service with the PUI element.

At stage 520, the UI management service can generate a PUI resource request based on the PUI element received in stage 518. In one example, the PUI resource request can be a script request. The script corresponding to the PUI element can be specified or included within the resource (script) request that adheres to a specific exchange protocol and identifies a parameter(s) tied to the module identifiers, such as the DM1-identifier. Returned data for the parameter can be converted into status updates or elements of status updates to be displayed, or components of an AUI to be delivered through the PUI, once received by the portal application.

In addition, the PUI resource request can include elements of an information package associated with a link corresponding to a selected application. In one example, this information can be parsed out by the web server and used in supplemental checks executed by components of the agent as to whether the most recent use-policy is being followed.

At stage 522, the UI management service can send the PUI resource request to a request handler of the web server. In one example, the portal application can be run on a browser and communicate with the web server through the browser. Since the browser is not provided by the web server, standard browser/server security restrictions can prevent the browser from sending out a request, for example an ajax or web socket request, to the web server. This can be referred to as a same-origin request policy, and as enforced, this policy can cause requests of the above types to fail if issued: (1) by code running on a webpage served by an originating web server; (2) to a web server different than the originating web server.

On the other hand, the communication in stage 522 involves information from the module manager successfully being provided in some form of a request to the web server, notwithstanding a same-origin policy. According to an exemplary aspect of the present disclosure, the communication in stage 522 is facilitated by a configuration of portal application and agent components, and a utilization of script or image functionality to push a resource request from a browser to the web server.

More specifically, the web server can be running embedded in the agent on the user device while the module manager can be embodied as code that is native to a script of the portal application (and thus not provided by a browser). Thus, both components are provided on the user device and a logical communication pipe or conduit is defined or created with the exemplary configuration described. With this two-way communication pipe, commands for handling protocols and launching a selected application can be conveyed and implemented without special plugins or permissions to install plugins being required.

The agent (through the web server) can receive PUI resource requests from the portal application that are generated as a result of operations of the module manager. The PUI resource request can include information from, or derived from, the module manager, that can be packaged into a script or image request. The resource request can cause the agent to perform certain actions as explained with reference to stages 530 to 540, which correspond to stage 230 of FIG. 2B. On the other hand, the portal application (through the UT management server) can receive UI resource responses from the agent through the logical pipe. The responses can cause the portal application to implement certain functions and cause a browser to show certain elements in the PUI, as explained with reference to stages 540 to 564.

As noted above, the PUI resource request in FIG. 5A include a script request. In one example, the responses to resource requests can match a type of request received, such that the script request provided in stage 522 is responded to in stage 540 with a script generated by the web server. It will be understood that methods according to the present disclosure can include image requests provided as resource requests that cause images to be provided in response. In other examples, an image response can be returned for a script request and vice versa.

In one example, the portal application continuously checks for updates with stages 524 and 526. At stage 524, the module manager checks to see if an execution completion notification has been received from the UI management service indicating that an update status or an AUI has been delivered through the portal application. In checking for updates and receiving whether or not an update has been provided, the portal application can log information related to the check that can be converted into instructions incorporated into a subsequent request for a PUI resource that is generated in stage 520.

At stage 526, the module manager can evaluate how much time has elapsed, or how many times a check for the execution notification has been performed, and determine if a time or iteration limit has been reached. Where a limit, which may be established through the portal by, for example, an admin, has not been reached, the module manager can perform another stage 524 check. However, as illustrated, where a preset amount of time has elapsed or a check iteration limit has been reached, the module manager can generate a new DM1 activation protocol in stage 512 and carry out stages 514 to 524 as previously described.

In one example, each PUI resource request generated in stage 520, even if it is a duplicate of most recently generated resource request, will be processed by the web server such that a PUI resource response is received by the module manager for that request.

At stage 530, the request handler can process the PUI resource request. In one example, the request handler can parse out the PUI element from the resource request and any included components of an information package underlying the link for the selected application.

At stage 532, at least the PUI element can be provided to a response generator of the web server. The response generator can recognize the PUI element as a request to obtain or register data for the parameter specified by the PUI element. Further the response generator, for indexing purposes, can recognize a module identifier, such as the DM1-identifier, included in the PUI element.

Stage 534 of the method can include the response generator continuously checking for information that corresponds to data for the parameter specified in the PUI element, and otherwise provides an update on the status or progress of: a virtual disk local download; an application launch; or a delivery of an AUI. As previously discussed, the web server can receive responses to requests for status updates for an application launch or virtual disk download from the app launcher or local disk launcher in stage 228. As illustrated in FIG. 5A, the response generator can continuously check for received status updates of some type, until one is received as part of stage 228.

The response generator can carry out stage 536 where information qualifying as data corresponding to the parameter specified in the PUI element, and thus qualifying as a status update, is received. Further, the response generator can process the information to identify the data corresponding DM1 parameter(s), and record it as data to be supplied to DM1 from another UI dynamic module. As illustrated in FIG. 5A, the corresponding data identified by the response generator can be recorded as UI dynamic module 2 ("DM2") data ("DM2 data").

At stage 538, the response generator can generate a UI resource. In one example, the PUI resource is a script or image file that can be processed by the UI management service, causing the portal application to deliver status updates or facilitate delivery of an AUI. In another example, the PUI resource includes or defines instructions for activating DM2 and implementing DM1 with the DM1 data. In one example, the UI resource is a script that includes the DM2 data and an activation protocol for DM2. The activation protocol for DM2 can specify that DM2 is to be automatically implemented once activated, and include an implementation protocol for DM1 in which DM2 data is provided as the data needed by DM1.

At stage 540, the response generator can provide the UI management service with the PUI resource generated in stage 538.

Turning to FIG. 5B, stage 552 can include the UI management service implementing an activation protocol for DM2 in response to receiving the PUI resource. In one example, DM2 includes code to be integrated into the portal page of the portal application. In one example, implementation of the DM2 activation protocol can include the UI management service generating DM2 within the portal page according to the PUI resource.

At stage 554, DM2 is automatically implemented as a result of completing the activation protocol. In one example, execution of this implementation protocol is caused by a processing of a script that defines the PUI resource. A call to DM1, along with an instruction to use the DM2 data, defines an implementation protocol for DM1 included in the PUI resource. The call to DM1, instruction to use the DM2 data, and the DM2 data can each be provided as part of code that defines DM2.

At stage 556, DM2 can provide DM1 with the implementation protocol. As noted above, the DM1 implementation protocol can be defined as a call to DM1 with an instruction to use the DM2 data to satisfy the data requirement for parameter(s) specified for DM1.

At stage 558, the implementation protocol for DM1 can be implemented and the portal application can: (1) display an update on the launch status of the application; (2) display an update on the download of a virtual disk; (3) facilitate the delivery an AUI by (A) allowing a separate window for the selected application to open in front of the PUI, or (B) causing the AUI to be rendered through the portal page of the portal application; or (4) all the actions of (3) after completing the actions in (1) or (2).

The actions performed by the portal application through the browser, will be dictated by the PUI resource response returned from the web server. The PUI resource response can reflect instructions for a local or a network launch of the application, as determined by the protocol handler in sub-stage 220C. For example, an AUI for a selected application can be delivered in different ways according to how the application is launched.

At stage 560, the UI management service can recognize that the implementation protocols for both DM1 and DM2 have been executed and send a notification to the module manager. In response, the module manager can deactivate DM2 and DM1 in stages 562 and 564 respectively. In one example, deactivation of dynamic modules can include the module manager archiving the UI modifying elements locally or in a remote storage location. In one example, the modules may be accessible for reference or implementation. In another example, deactivation can include the module manager removing DM1 and DM2 from the portal application in a substantially permanent manner.

In one example, using a portal application and an agent including a web server to access applications as described can reduce or eliminate a need for local installs (full or administrative) or uninstalls. Creation of a native install footprint on the user device may also not be required, even though applications can launch immediately across a network. Further, the system can bypass logon delays by using run-from-network or run-locally user entitlements.

In addition, downloading or installing special plugins may not be required, because a module manager can be native to a script of the portal application and provided by a portal. The incorporation of a web server within the agent running on the user device can enable two-way communication between the agent and the portal application through a browser. As a result, the agent can notify the portal application through the browser that an executable for a selected application has been located and is about to be launched. The browser can manage that feedback as information package elements, such as URL elements, on the catalog page. This can allow the portal application to launch applications on a just-in-time basis without special client-side software.

In one example, a browser can display an application listed in the PUI, such as MICROSOFT WORD. When selected by the user, the application can be implemented on the user device without first needing to be downloaded or installed. Any browser may be used in some examples. The methods and systems can be implemented in any of the environments (physical, on-premises, VDI, cloud) utilized by an enterprise, in an example.

In another aspect, a selected application can be implemented, alone and only when it is selected, from a virtual disk that is specific to the selected application. The virtual disk can be accessed either locally or through a portal that the user device is currently logged on to. Thus, downloading of applications or virtual disks are not required at the times when a user logs on to an operating system on the user device, or logs onto to a portal through a portal application. Accordingly, operations of the user device are not slowed at the time of either logon due to resources being allocated to any type of download or install at that time.

As noted above, the PUI resource request and response can implement script request and response functionality in one example of the present disclosure. In another example, images can be exchanged between the portal application and the agent in order to implement selected applications. Data or code can be embedded in pixels or translated from attributes of the image, such as image dimensions or pixel color data.

In one example, the web server can create an image and embed "data" inside pixels of the image that is then returned to the portal application. The portal application may process the image as a hidden page element, read the pixels, and extract data out of the pixels, and provide updates in the PUI according to the data it processes from the pixels. In another example, data that the portal application may require for an update in particular may be conveyed as image parameters that the portal application can recognize. For example, for a completion percentage and time remaining before a selected application is implemented, the web the server can returns an empty image with dimensions width=A and height=B, which the portal application can recognize as A=percent complete, and B=time remaining.

FIG. 6 provides an illustration of exemplary system components for performing the methods of FIGS. 1-5. As shown in FIG. 6, a system 600 can include a portal 610 and one or more active sites 620A, 620B, 620C, 620D. The portal 610 may include one or more management servers 612 and one or more authentication servers 614. Alternatively, the portal 610 may be one or more servers that communicate with the management server 612 and authentication server 614. Each active site can include a connector 622 in communication with the portal 610, a site manager 624, a file system 626, and one or more end point user devices 628.

Each of the management server 612 and the authentication server 614 can be a server, computing device, or network of multiple servers or computing devices, having one or more processors and memory stores. The management server 612 can control access to applications or enterprise data by, for example, issuing an access token to the device that allows the device to access one or more enterprise resources. The applications can communicate directly with the management server 612 via a network, such as the Internet. The authentication server 614 can be an identity management server such as VMWARE IDENTITY MANAGER.

The connector 622 may be an application implemented on the site manager 624 that provides a platform where virtual machines, virtual disks, or DFS shares can be replicated, or moved between servers, cloud computing entities, and DFS shares. The connector 622 and the services it provides, or the services the portal 610 provides through the connector 622, may be customized so as to be specifically configured for a domain of each active site 620A, 620B, 620C, 620D. The site manager 624 may include a server or other computing device that maintains the connector 622, displays a UI for the connector 622, and coordinates the replicating and moving of virtual machines, virtual disks, or DFS shares.

In one example, the file system 626 may be constituted by a logical DFS share that is configured in a domain of the active site, and maps to site-local, physical server message block ("SMB") network attached storage ("NAS") shares. In one example, the SMB NAS shares may be sized for site-level availability, latency, performance, and replication, and store virtual disk files. In one example, the DFS share provided by the file system 626 may be configured with an access control list ("ACL") that specifies what files or objects particular users or groups of users have access to. The DFS share may be further configured to execute replication across active sites.

Each of the user devices 628 can be any computing device, such as personal computer or a workstation, or more often, a smartphone, laptop, or a tablet. Each user device 628 can include a non-transitory, computer-readable medium containing instructions executed by a processor. Example non-transitory, computer-readable mediums include RAM and ROM, disks, and other memory and storage accessible by a USB port, floppy drive, CD-ROM or DVD-ROM drive, and a flash drive, among others.

In one example, with a selection of an application or application by a user via a user device 628, the user device 628 can run the application or applications: (A) utilizing a site-local SMB NAS share that includes a corresponding virtual disk file; and (B) according to admin-configured use-policies that are applied and refreshed with every logon to the portal 610 by the user. In another example, the use-policy may allow the user device 628, through an agent, to download and cache one or more virtual disk files for subsequent local execution, to fulfill performance or offline requirements.

FIGS. 7A and 7B provide illustrations of components corresponding to the system components illustrated in FIG. 6, carrying out admin and endpoint workflows that incorporate the methods of FIGS. 1-5. Elements of FIGS. 7A and 7B that are identified with odd reference numerals and represented with dotted lines or containers represent: (A) stages and processes being executed; and (B) discrete information being transmitted as part of the processes. Containers with solid boundaries represent components of the system, or properties of those components prior to execution of the various illustrated stages or processes. These components and properties are identified with even reference numerals.

In particular, FIG. 7A illustrates an application capture service 710 and a portal 720 operating through an admin workflow process that can provide a catalog of applications. The catalog can be delivered and implemented through a portal application 736 on a physical end point as shown in FIG. 7B. At stage 711, the applications can be captured by the app capture service 710. At the end of a capture session, the installed applications may be embodied by respective combinations of JSON files 712 and virtual disk files 714.

In the case of an application that normally sets up entry-points during a standard installation, the entry points may be detected by the app capture service 710 and recorded in a corresponding JSON file 712. In one example, an entry point may be an object, for example a shortcut provided in a Start Menu and or a Desktop, that a user may use to launch and implement an application. In another example, an entry point may be a path to an interface executable (.exe) file. In addition, the app capture service 710 may store other metadata in the JSON file 712 such as: (1) an ID attribute that uniquely identifies a respective application or bundle of applications; and (2) file size attribute—a size of the virtual disk file in bytes.

With respect to the virtual disk file, the app capture service 710 can produce a compressed version of the virtual disk file that is stored within the virtual disk file, for example in a root folder. An agent installed on a user device can, in one example, locate and download the compressed file without a file system attachment/mount.

A portal 720 and a storage component 724, such as the portal 610 and file system 626 in FIG. 6, can communicate with the app capture service 710. In one example, the portal 720 can provide an on-cloud control plane, with on-premises connector services that connect an on-premises active directory domain controller to a cloud. Admins for the portal 720 can onboard applications captured by the app capture service 710, and catalog and assign applications to domain entities such as individual enterprise users and groups. Admins can further create user entitlements using the portal. The user entitlements can authenticate end-users. They can also allow the portal application to host self-service user-interfaces so that end users may utilize respective entitlements.

More specifically the portal 720, which can include an application catalog 722, can import or receive one or more JSON files 712 in stage 725. JSON files are one form of metadata that may be created by the app capture service, but other file types are also possible. The interface executable can be provided to the portal 720 and used to extract information that will be included in links, such as URLs, that are tied to entries points for applications presented in and selectable from a catalog. The catalog being provided on a user device by a portal application. The storage component 724, which may be provided as a logical DFS share mapped to an SMB share, can import or receive the virtual disk(s) 714 in stage 727, and store them as a virtual disk 728. In stage 729, the portal 720 can process a JSON file 712 and add any new applications from the JSON file. In one example, this may include creating a new selectable option and link in the catalog, or updating any features or links for any current applications according to information from the JSON(s) 712.

In one example, the portal 720 can identify a list of entry-points that it presents in a portal-implemented admin UI in stage 729. An admin for the portal 710 can then select the entry-points for the application or bundle of applications that users will be able to use. The set of entry-points selected by the admin can be presented as tiles to an end-user under the user's catalog (see tile 830 and catalog page 820 of FIG. 8). In addition, the admin can identify a file path (SMB DFS share path), where the virtual disk will remain stored in the storage component 724. The file path can be specified in a query parameter for one or more links associated with a respective application in the catalog.

In stage 731, the portal 720 can further process the information in the JSON file(s) to establish user assignments, permissions, and use-policies for new applications, and update the same of any other applications in the catalog. In one example, a DFS share that embodies the virtual disk 728 can be configured so that different entities have different permissions. For example, a domain admin may have read and write permissions for administrative purposes, a user device may have read-only permissions, and an import admin may have read and write permission in order to copy the virtual disk to the storage component 724.

In contrast to FIG. 7A, FIG. 7B illustrates a workflow that is initiated by a user attempting to log on to the portal 720 through a user device 732 at stage 741. Prior to stage 741, the user may have logged on to the user device 732 to start a user session. However, an additional logon process may be required to gain access to an application catalog. Accordingly, stage 741 can include the portal application 732 implementing a PUI on the user device 732, and receiving a user's credentials through the PUI. Stage 741 can further include the portal application 734 requesting authentication of the credentials by the portal 720.

At stage 743, the portal 720 can process the credentials and authenticate the user device, specifically the portal application 734 operating on the user device 732, for access to an application catalog associated with the user having the provided credentials. At stage 745, the portal application can load the catalog in a portal page of the PUI.

In one example, the portal application 734 may be provided through a browser 736 installed on the user device 732. The browser 736 may be an internet browser of any type such as CHROME, MOZILLA FIREFOX, or INTERNET EXPLORER. The portal application 734 can communicate with the agent 738 through code provided by the portal 720 to provide all the capabilities of the exemplary agent of FIGS. 2A, 2B, and 3.

A portal page 750 can be displayed on the user device 732 as a result of stage 745. In one example, stage 745 can extend to the portal application 734 continuously managing and updating the portal page 750. The portal page 750 can include the catalog of applications and be configured to receive a selection of any of the applications in the catalog. In particular, a selection can be received and communicated to the agent 738 by the portal application, either directly or through the browser in stage 751.

In stage 753, assuming a logon with the portal 720 persists, the agent can transmit the application selection to the portal 720 to check permissions and download policies. This communication may correspond to part of the communications carried out by the protocol handler in stage 218 as illustrated in FIG. 2.

At stage 755 of the endpoint workflow, the agent 738 can access a virtual disk corresponding to the selected application. This can include attaching the virtual disk in the storage component 724 as shown. As the agent accesses the virtual disk, continuous communication between the agent 738 and the portal application 734 results in the status updates being displayed by the portal application 734 through the browser 736 in stage 757. Once the agent 738 completes the access process in stage 755, the application may be launched by the agent in stage 759, and a respective AUI can be delivered by the portal application 736 in stage 761.

FIG. 8 illustrates an exemplary PUI 800 with a portal page 820 of a portal application 810 that includes a catalog of applications that may be selected for implementation by a user 822 using the portal application 810. The portal page 820 may allow the user 822 to view applications in the catalog according to type 824 and category 826. As further illustrated, tiles 830 represent selectable applications with application IDs 832 provided within each tile 830. From user interface and interaction perspective, the tiles 830 can appear to work similar to SaaS applications.

In addition, each tile 830 may include an option display section 834 for indicating choices for opening an application (local or network) where an option exists. In the exemplary PUI 800, all the tiles 830 illustrated can only be opened across a network and therefore only have one "Open" option. In one example, a tile for an application that can be opened according to user option may include an "Open-Local" option and an "Open-Network" option in a respective option display section 834.

In one example, the tiles 830 can carry additional information describing an entry-point, as hidden DOM-element attributes that can be displayed as mouse-over tool-tips. Example attributes can include version, size, platform, and architecture for the application. In another example, these attributes can enable a client-side (or server-side) script to automatically filter a tile-set corresponding to type 824 and category 826, based on a User-Agent ("UA") string encoded with the attributes. In still another example, when a user successfully logons on to the portal, an on-load/in-page script that runs on the portal page 820 can conduct an auto-sweep of all assigned tiles for the user, construct an all-applications URL, and navigate to the all-applications URL. The all-applications URL can encode a UA string for each application or application bundle currently assigned to the user. In one example, along with this encoding, an agent operating on the user device implementing the portal page 820 will receive a notification that a successful portal logon has occurred. Further, having received the notification, the agent can populate/re-hydrate an application map specific to the user that has logged on to the portal.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for implementing applications on a user device on a just-in-time basis, the method comprising:
receiving a selection of an option presented in a user interface of a portal application, the option corresponding to an application or a bundle of applications;
obtaining, with an agent on the user device, an information package for the option through the portal application, the information package including parameters, one of the parameters indicating a type of virtual disk access;
querying, with the agent operating on the user device, the information package;
determining a use-policy based on the parameters identified from querying the information package, the use-policy specifying the type of virtual disk access and protocols for the agent to:
access a virtual disk corresponding to the selected application or bundle of applications, and
launch the selected application or bundle of applications from the virtual disk;
accessing the virtual disk with the agent according to the use-policy; and
sending, from the portal application to the agent, a resource request for an update on a status of at least one of a virtual disk download and an application launch;
wherein the resource request is one of a script request and an image request, and
wherein the resource request is generated by the portal application based on the information package in accordance with the type of virtual disk access as specified in the use-policy.

2. The method of claim 1, further comprising:
receiving a response to the resource request; and
displaying data from the response in the portal application.

3. The method of claim 1, wherein the type of virtual disk access causes the agent to download a local copy of the virtual disk, and data from the response in the portal application includes a download completion percentage.

4. The method of claim 2, wherein the resource request is a script request that is generated by the portal application and provided to a web server of the agent through a browser, and wherein the response is a script response that is provided from the web server to the portal application through the browser.

5. The method of claim 2, wherein sending the resource request includes activating a first dynamic module ("DM1") that is identified in the resource request, and wherein the response includes an activation protocol for activating a second dynamic module ("DM2") on the portal application that implements DM1 and provides DM1 with the data.

6. The method of claim 5, further comprising:
sending a notification to a module manager of the portal application in an instance where an implementation of DM1 is completed; and
deactivating, with the module manager, DM1 and DM2 with respect to a portal page of the portal application.

7. A non-transitory, computer-readable medium comprising instructions that, when executed by a processor, perform stages for implementing applications on a user device on a just-in-time basis, the stages comprising:
receiving a selection of an option presented in a user interface of a portal application, the option corresponding to an application or a bundle of applications;
obtaining, with an agent on the user device, an information package for the option through the portal application, the information package including parameters, one of the parameters indicating a type of virtual disk access;
querying, with the agent operating on the device, the information package;
determining a use-policy based on the parameters identified from querying the information package, the use-policy specifying the type of virtual disk access and protocols for the agent to:
access a virtual disk corresponding to the selected application or bundle of applications, and
launch the selected application or bundle of applications from the virtual disk;
accessing the virtual disk with the agent according to the use-policy; and
sending, from the portal application to the agent, a resource request for an update on a status of at least one of a virtual disk download and an application launch;
wherein the resource request is one of a script request and an image request, and
wherein the resource request is generated by the portal application based on the information package in accordance with the type of virtual disk access as specified in the use-policy.

8. The non-transitory, computer-readable medium of claim 7, the stages further comprising:
receiving a response to the resource request; and
displaying data from the response in the portal application.

9. The non-transitory, computer-readable medium of claim 8, wherein the type of virtual disk access causes the agent to download of a local copy of the virtual disk, and wherein the data from the response includes a download completion percentage.

10. The non-transitory, computer-readable medium of claim 8, wherein the resource request is a script request that is generated by the portal application and provided to a web server of the agent through a browser, and wherein the response is a script response that is provided from the web server to the portal application through the browser.

11. The non-transitory, computer-readable medium of claim 8, wherein sending the resource request includes activating a first dynamic module ("DM1") that is identified in the resource request, and wherein the response includes an activation protocol for activating a second dynamic module ("DM2") on the portal application that implements DM1 and provides DM1 with the data.

12. The non-transitory, computer-readable medium of claim 11, the stages further comprising:
sending a notification to a module manager of the portal application in an instance where an implementation of DM1 is completed; and
deactivating, with the module manager, DM1 and DM2 with respect to a portal page of the portal application.

13. A system for implementing applications on a user device on a just-in-time basis, comprising:
a memory storage including a non-transitory, computer-readable medium comprising instructions; and
the user device including a processor that executes the instructions to carry out stages comprising:

receiving a selection of an option presented in a user interface of a portal application, the option corresponding to an application or a bundle of applications;

obtaining, with an agent on the user device, an information package for the option through the portal application, the information package including parameters, one of the parameters indicating a type of virtual disk access;

querying, with the agent operating on the user device, the information package;

determining a use-policy based on the parameters identified from querying the information package, the use-policy specifying the type of virtual disk access and protocols for the agent to:
  access a virtual disk corresponding to the selected application or bundle of applications, and
  launch the selected application or bundle of applications from the virtual disk;

accessing the virtual disk with the agent according to the use-policy; and sending, from the portal application to the agent, a resource request for an update on a status of at least one of a virtual disk download and an application launch;

wherein the resource request is one of a script request and an image request, and wherein the resource request is generated by the portal application based on the information package in accordance with the type of virtual disk access as specified in the use-policy.

14. The system of claim 13, the stages further comprising:
receiving a response to the resource request; and
displaying data from the response in the portal application.

15. The system of claim 14, wherein the type of virtual disk access causes the agent to download of a local copy of the virtual disk, and wherein the data from the response includes a download completion percentage.

16. The system of claim 14, wherein the resource request is a script request that is generated by the portal application and provided to a web server of the agent through a browser, and wherein the response is a script response that is provided from the web server to the portal application through the browser.

17. The system of claim 14, wherein sending the resource request includes activating a first dynamic module ("DM1") that is identified in the resource request, and wherein the response includes an activation protocol for activating a second dynamic module ("DM2") on the portal application that implements DM1 and provides DM1 with the data.

18. The system of claim 17, the stages further comprising:
sending a notification to a module manager of the portal application in an instance where an implementation of DM1 is completed; and
deactivating, with the module manager, DM1 and DM2 with respect to a portal page of the portal application.

* * * * *